United States Patent
Zheng et al.

(10) Patent No.: US 9,490,885 B1
(45) Date of Patent: Nov. 8, 2016

(54) PROXIMITY SENSOR AND ANTENNA SYSTEM ARRANGEMENT FOR METAL HOUSING

(71) Applicant: Amazon Technologies, Inc., Seattle, WA (US)

(72) Inventors: Ming Zheng, Cupertino, CA (US); Adrian Napoles, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 25 days.

(21) Appl. No.: 14/702,197

(22) Filed: May 1, 2015

(51) Int. Cl.
*H04B 7/06* (2006.01)
*H04W 52/18* (2009.01)

(52) U.S. Cl.
CPC ........... *H04B 7/0608* (2013.01); *H04W 52/18* (2013.01)

(58) Field of Classification Search
CPC ............................. H04B 7/0608; H04W 52/18
See application file for complete search history.

(56) References Cited

U.S. PATENT DOCUMENTS

| | | | |
|---|---|---|---|
| 8,798,695 B1 | 8/2014 | Zheng et al. | |
| 2008/0051165 A1* | 2/2008 | Burgan | H04W 52/0254 455/575.6 |
| 2011/0250928 A1* | 10/2011 | Schlub | H01Q 1/243 455/550.1 |
| 2012/0164962 A1* | 6/2012 | Lin | G06F 1/1684 455/127.1 |
| 2012/0214412 A1* | 8/2012 | Schlub | G01B 7/023 455/41.1 |
| 2013/0029625 A1* | 1/2013 | Park | H01Q 1/243 455/272 |
| 2013/0217342 A1* | 8/2013 | Abdul-Gaffoor | H03K 17/955 455/77 |
| 2014/0087786 A1* | 3/2014 | Tani | H04M 1/026 455/556.1 |
| 2015/0044977 A1* | 2/2015 | Ramasamy | H04B 7/0404 455/77 |
| 2015/0303979 A1* | 10/2015 | Shin | H04B 1/74 455/78 |
| 2015/0357702 A1* | 12/2015 | Tani | H01Q 5/321 343/904 |
| 2016/0036474 A1* | 2/2016 | Broyde | H01Q 1/242 455/77 |
| 2016/0056853 A1* | 2/2016 | You | H04B 15/00 455/73 |

* cited by examiner

*Primary Examiner* — Nathan Mitchell
(74) *Attorney, Agent, or Firm* — Seyfarth Shaw LLP; Ilan N. Barzilay; David A. Klein

(57) ABSTRACT

A unified proximity sensor including multiple physically separated radio antenna structure for mobile electronic devices that senses proximity of a person to the antennae. Changes in capacitances of the antennae are detected based on a low frequency signal output by a single capacitance sensor. As a human body approaches any of the antennae, this capacitance increases. Based on the increase in capacitance, the transmission powers of radio signals emitted by the antennae are reduced.

20 Claims, 16 Drawing Sheets

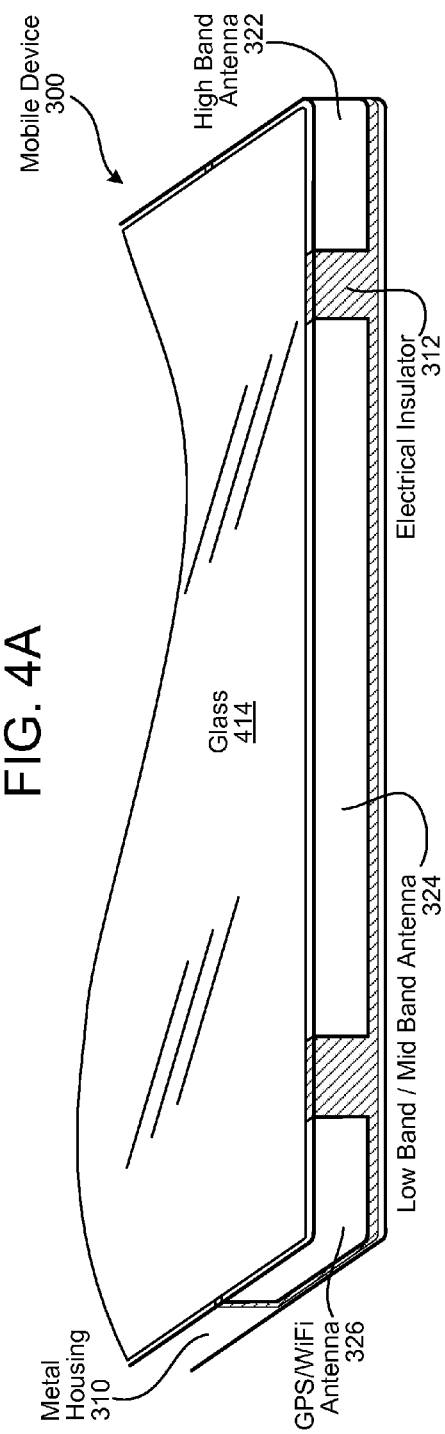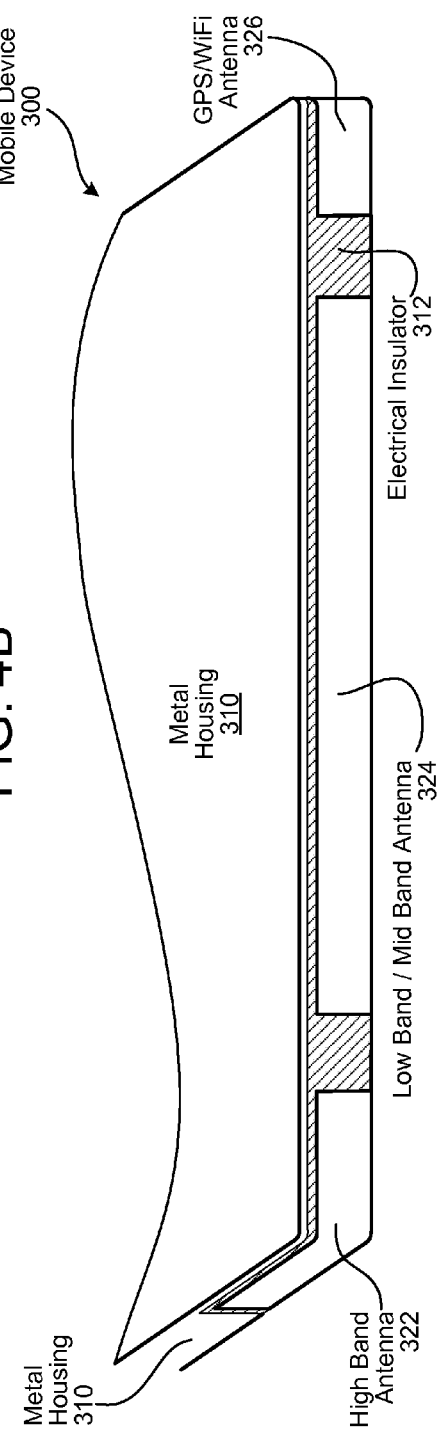

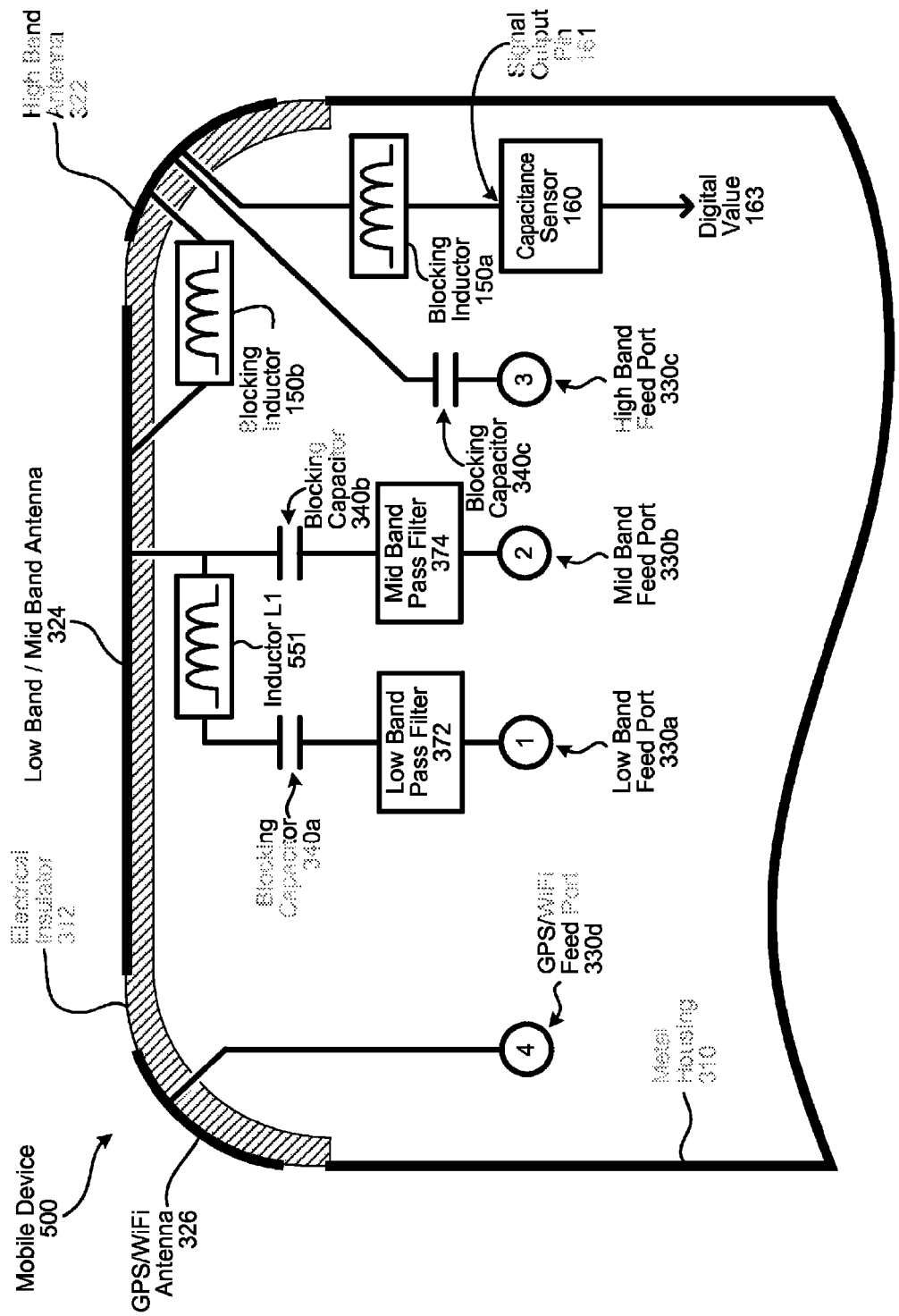

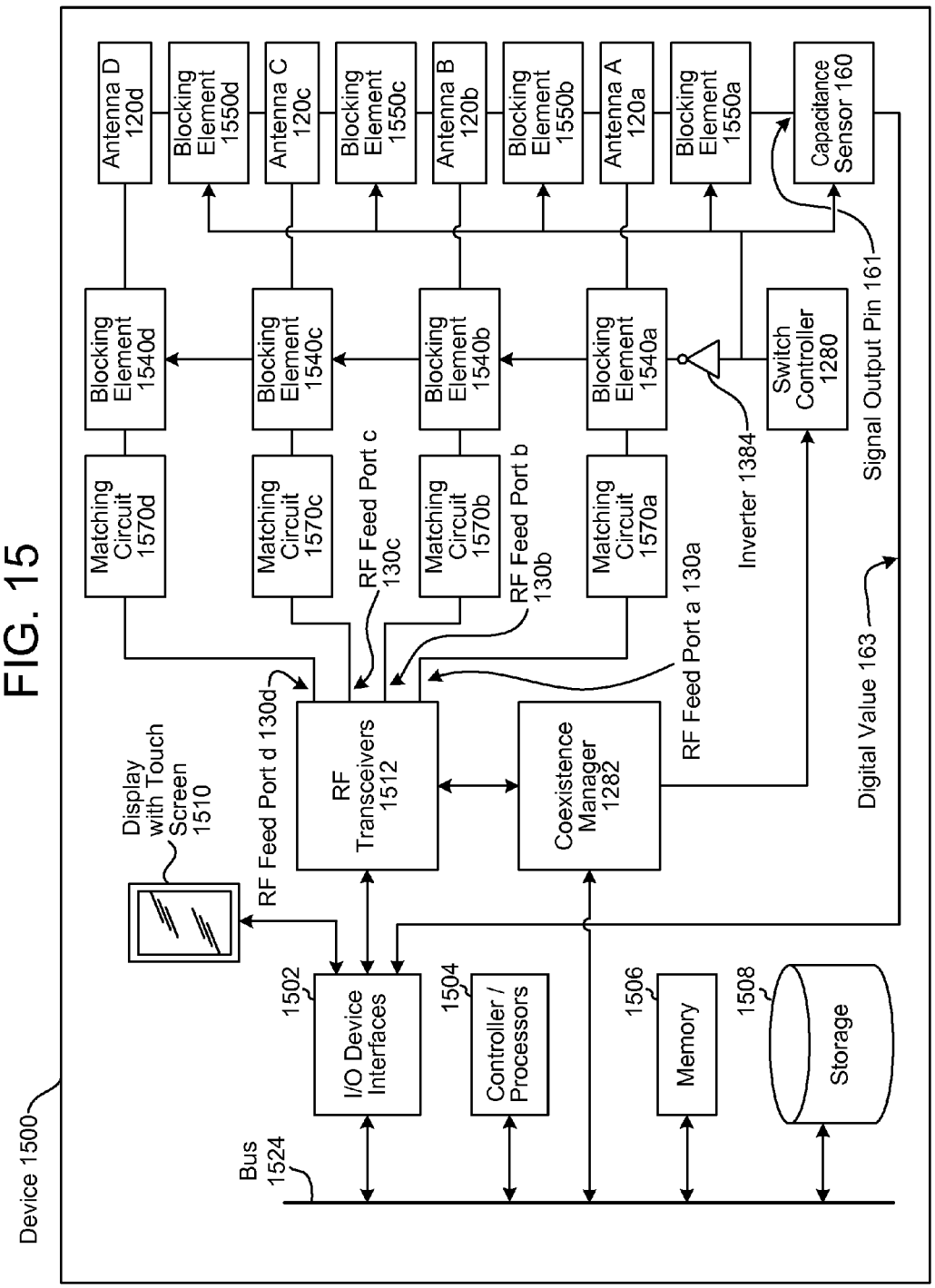

PROXIMITY SENSOR AND ANTENNA SYSTEM ARRANGEMENT FOR METAL HOUSING

BACKGROUND

The increasing use of wireless communication links between a large variety of devices has led to numerous advancements in antenna design. Mobile electronic devices such as cellular telephones and tablet computers communicate wirelessly in a number of different frequency bands that are specified in various industry standards. A variety of antenna designs are incorporated in such devices to facilitate communication on one or more frequency bands, in accordance with the standards. Mobile electronic devices may include multiband antenna configurations that facilitate communication on more than one frequency band.

BRIEF DESCRIPTION OF DRAWINGS

For a more complete understanding of the present disclosure, reference is now made to the following description taken in conjunction with the accompanying drawings.

FIGS. 4A and 4B illustrates end views of the antennae structures in the example in FIG. 3.

FIGS. 5 and 6 illustrate additional examples of the circuit integrated into a mobile computing device.

FIG. 15 is a block diagram conceptually illustrating example components of an electronic device including the unified proximity sensor and multiple antennae sharing the same physical structures.

Figure 1:
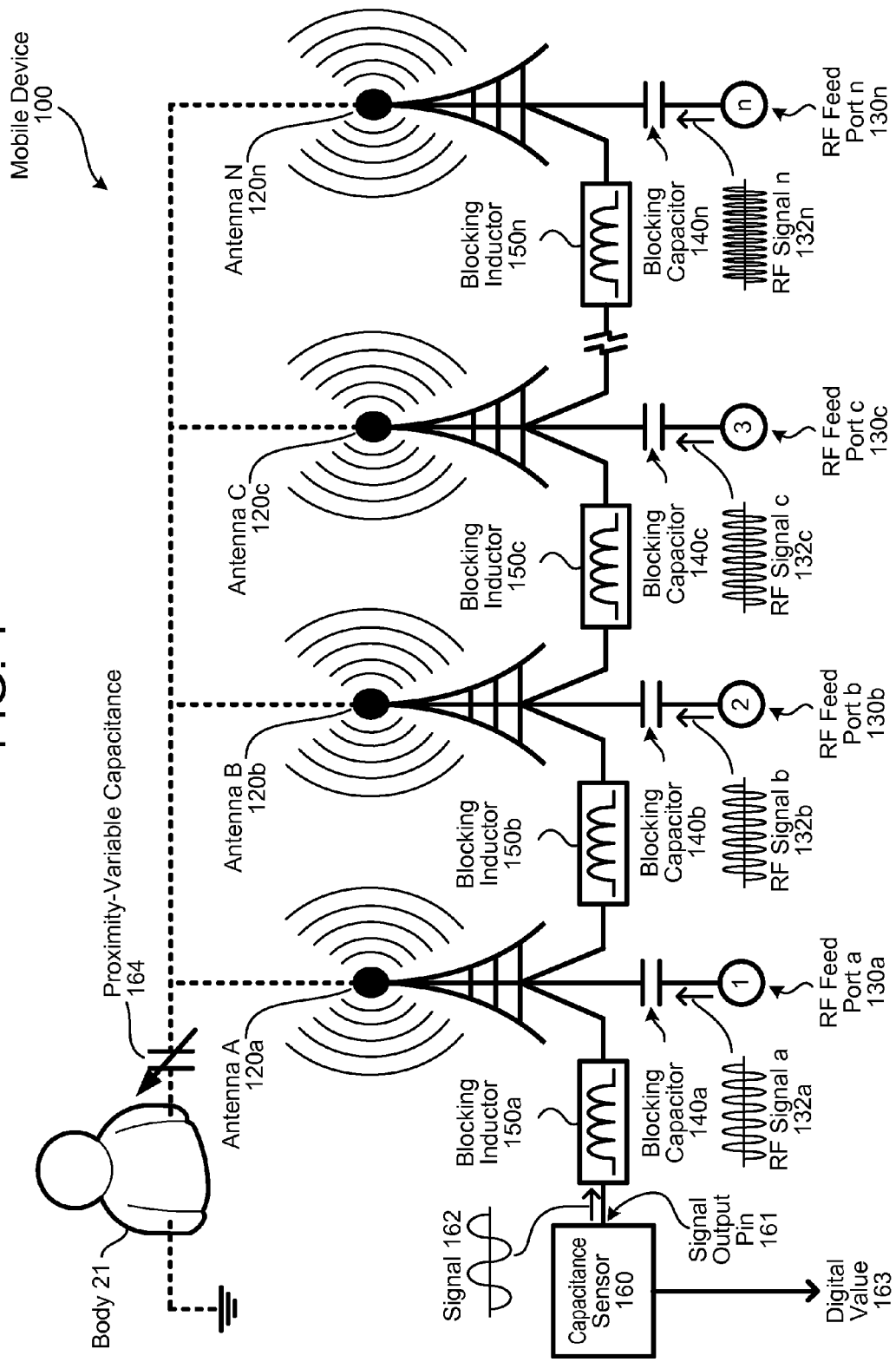
FIG. 1 is a high-level conceptual overview of a circuit where a unified proximity sensor and multiple antennae share the same physical structures.

Unless stated otherwise, the figures are not drawn to scale and the relative sizes of features are not proportional.

DETAILED DESCRIPTION

Each antenna in a mobile device may include one or more resonant elements configured to operate within a frequency band. A single antenna structure may contribute to resonance in more than one frequency band. When transmitting, each resonant element generates an energy emission "hotspot" associated with resonance in the transmission frequency band. Government regulations place limits on the energy emissions from such hotspots.

Specific Absorption Rate (SAR) is a measure of the rate at which RF (radio frequency) energy is absorbed by the human body. SAR provides a means for measuring the RF exposure characteristics of cellular telephones and other wireless devices to ensure that they are within the safety guidelines set by regulatory agencies, such as the Federal Communications Commission (FCC) in the United States of America. The SAR values are intended to ensure that a cellular telephone or other wireless device does not exceed the a maximum permissible exposure level even when operating in conditions which result in the device's highest possible (but not its typical) RF energy absorption for a user.

SAR testing uses standardized models of the human head and body that are filled with liquids that simulate the RF absorption characteristics of different human tissues. In order to determine regulatory compliance, a mobile device is tested while operating at its highest power level in all the frequency bands in which it operates, and in various specific positions against a dummy head and body, to simulate the way different users typically hold a mobile device, such as against each side of the head for a cellular telephone, or held in a hand or placed on a lap for a tablet computer.

To test cellular telephones for SAR compliance, the device is precisely placed in various common positions next to the head and body, and a robotic probe takes a series of measurements of the electric field at specific pinpoint locations in a precise, grid-like pattern within the dummy head and torso. In the United States, the FCC uses the highest SAR value for each frequency band to demonstrate compliance with the FCC's RF guidelines.

Current FCC guidelines require mobile electronic device manufacturers to ensure that the maximum exposure is at or below a SAR level of 1.6 watts per kilogram (1.6 W/kg) with a 1 gram mass. However, while the exposure for cellular telephones is measured at a typical separation distance of 10 to 20 millimeters from the telephone dependent on the device's carrier case thickness, tablet computers are tested with a separation distance of zero millimeters. At a zero millimeter distance, SAR will ordinarily be well above the FCC limit.

To accommodate this compliance issue, the FCC has adopted a tiered "modular approach," authorizing usage of tablet computers that have SAR hotspots with emission energies over the limit at zero millimeters if proximity sensors are included to detect when the emitting antenna element is proximate to a user so that transmission energy can be reduced to comply with the SAR limits. In order to meet this regulatory accommodation, a proximity sensor must be collocated with each antenna, and the antenna's peak SAR location must overlap the sensor. If an antenna and its proximity sensors are not co-located at the same area, coverage tests are required.

Coverage tests are difficult to pass and may require a reengineering of the device to optimize sensor sensitivities and placement. For example, coverage tests require detecting the approach of a user at various angles relative to each antenna, such as a body approaching from the right, a body approaching from the left, a body approaching from above, etc. These tests must be individually passed by each antenna that otherwise operates over the SAR limit.

Meeting the co-location requirement is particularly challenging, as it ordinarily requires distributing several proximity sensors around each antenna. Among other things, such an arrangement raises the cost of the device and, given the constraints on space available within a tablet computer, may require making design tradeoffs.

Moreover, in tablets that have metal housings, typically only small slot cuts are made in the housing around the antenna. The exposed surface area through the housing provided by these slots cuts may be inadequate to accommodate coverage using conventional proximity sensors. While enlarging the openings is an option, this may weaken the strength of the structure, lack aesthetic appeal, and require increasing the overall thickness of the device.

FIG. 1 is a high-level conceptual overview of a circuit where a proximity sensor and multiple antennae share the same physical structures in a mobile device 100. Each antenna 120a to 120n is physically separate from the other antennae, and may operate independently in various frequency bands while acting together as a part of a single proximity sensor. As the antennae and proximity sensor share the same area, the coverage test is no longer needed for regulatory compliance. Based on a "proximity" value corresponding to the distance between a body 21 and the shared proximity sensor, the power of RF transmitters with in the device 100 may be reduced as proximity increases.

The circuit design illustrated in FIG. 1 takes advantage of a difference in operational frequencies between contemporary RF communications and the frequencies used for capacitance-based proximity sensing.

A capacitance sensor 160 typically outputs a signal 162 having a fixed frequency in the range of 100 kHz to 250 kHz via a signal output pin/electrode 161. The signal output pin/electrode 161 is connected to an electrical conductor and is used to measure a variable capacitance 164 of the conductor that changes when a human body 21 approaches. Human bodies can store a charge (referred to as "body capacitance"). The dotted lines in FIG. 1 that extend from the antennae 120 and the variable capacitance 164 are not physical circuit components, but rather represent the "body capacitance" phenomena used by the device 100 to detect the proximity of the body 21 to the antenna(s) 120.

As the body 21 approaches the electrical conductor(s) forming the antennae 120, capacitive "coupling" between the body 21 and the conductor(s) increases as the signal 162 interacts with the body 21. In effect, the electrical conductor(s) coupled to the signal output pin/electrode 161 of the capacitance sensor 160 that conduct the signal 162 act as a combined plate of a "parallel plate" capacitor and the body 21 acts as an opposite plate. The capacitance sensor 160 may detect this variable "body" capacitance 164 (among other ways) by measuring fluctuations in the time it takes for the proximity signal 162 to reach a specific voltage, with the time delay increasing as capacitive coupling between the antennae 120 and the body 21 increases. The larger the proximity-variable capacitance 164 becomes, the larger the time delay measured by the capacitance sensor. The capacitance sensor 160 output a digital value 163 dependent on the measured capacitance on the output pin/electrode 161.

In comparison to the frequency of the signal 162 output by the capacitance sensor 160 (e.g., 100 to 250 kHz), the RF bands used by mobile computing devices start at around 699 MHz. For example, referring to the Long Term Evolution (LTE) Fourth Generation (4G) cellular telephony standard, Low Band (LB) is generally in a range of 699 MHz to 960 MHz (overlapping with the WCDMA and GSM Third Generation cellular radio standards), Mid Band (MB) is generally in a range of 1,710 MHz to 2,170 MHz (also overlapping with WCDMA and GSM), and High Band (HB) is generally in a range of 2,305 MHz to 2,690 MHz. The IEEE 802.11 WiFi wireless local area network (WLAN) standards generally use frequencies around 2,400 MHz and 5,000 MHz, with newer incarnations using even higher frequency bands such as 60,000 MHz (i.e., 60 GHz). The Bluetooth personal area network (PAN) standard also uses frequencies around 2,400 MHz. The WiMAX communications standard (i.e., IEEE 802.16) typically uses frequency bands around 2.3 GHz, 2.5 GHz, and 3.5 GHz. The Global Position System (GPS) navigation satellites broadcast RF signals at around 1,228 MHz and 1,575 MHz, and the GLONASS navigation satellites broadcast at around 1,246 MHz and 1,602 MHz. In other words, all of the radio communication frequencies and frequency bands ordinarily used by conventional cellular telephones and tablet computers are more than three orders of magnitude larger than the highest frequency used by a conventional capacitive sensor.

The circuit design in FIG. 1 includes a plurality of radio frequency (RF) feed ports 130a to 130n, which are tied to radio transceivers (not illustrated) to transmit and receive RF signals 132a to 132n in the various RF frequency bands (e.g., LTE Low Band, LTE Mid Band, LTE High Band, GPS, Bluetooth, WiFi, etc.). A "feed" refers generally to the circuit path of an RF signal 132 between an antenna 120 and the connected transmitter/receiver/transceiver. A "port" is an electrical conductor and/or terminal to which RF energy is input/coupled.

Figure 2A:
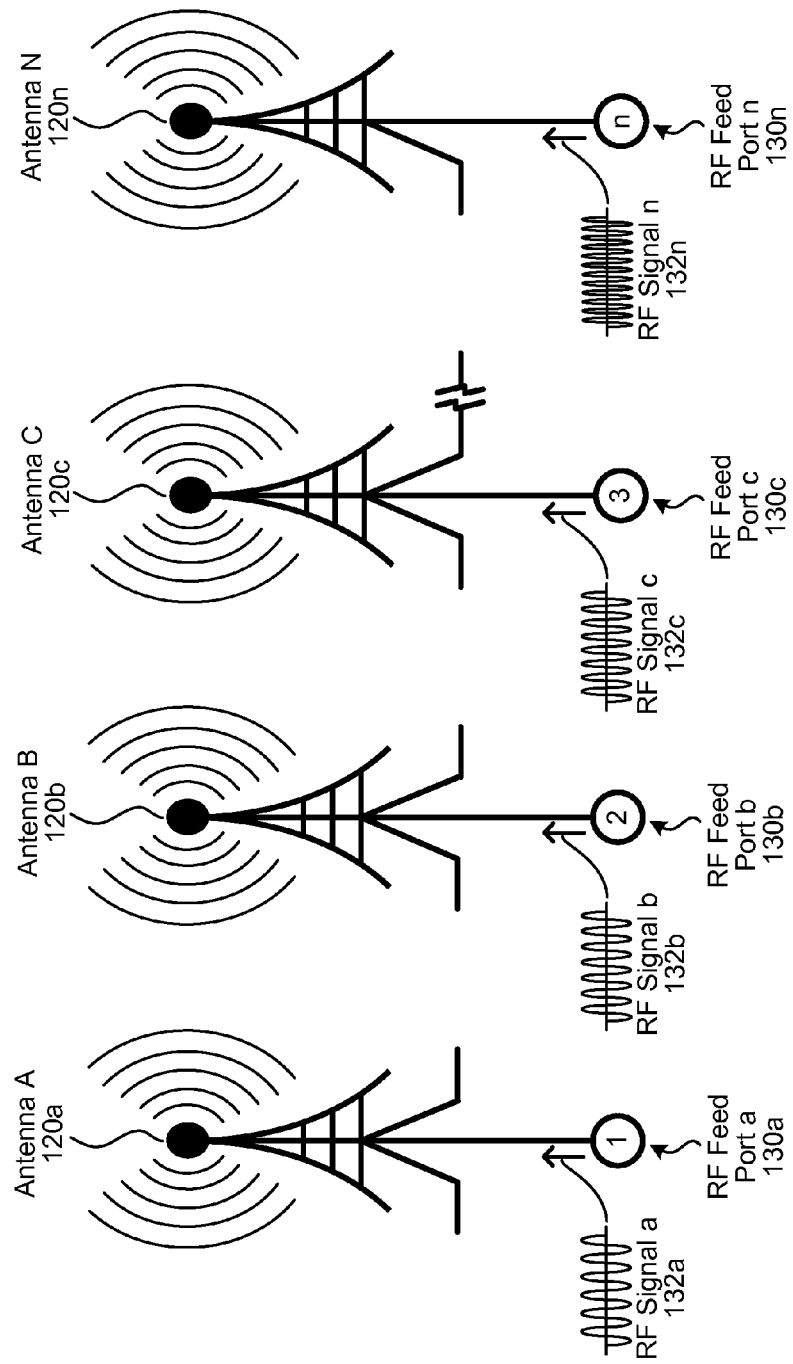
FIG. 2A demonstrates idealized pathways through the circuit in FIG. 1 for radio frequency (RF) signals to be transmitted (and received) by the antennae.

A "blocking" inductor 150a connects the capacitance sensor 160 to a first antenna (Antenna A 120a), and a blocking inductor (150b to 150n) is provided between each pair of antennae thereafter to connect each antenna to a next antenna in a chain forming the unified proximity sensor. As used herein, a component is "blocking" an applied signal if it attenuates the applied signal by at least 20 dB (decibels) of its input strength. The impedance of an inductor increases as the frequency of an applied signal increases, as well as with increasing inductances. Impedance is a measure of the opposition to time-varying electrical current in a circuit. The inductances of the blocking inductors 150a to 150n are selected to have a high impedance at the frequencies of the RF signals 132a to 132n, approximating as "open" circuits. This is illustrated in FIG. 2A, where the high impedance of the blocking inductors 150a to 150n provides no pathway (or at least, a substantially attenuated pathway that can be approximated as "no" pathway) for the RF signals 132a to 132n. Thus, the "blocking" inductors "block" the path of the RF signals.

Figure 2B:
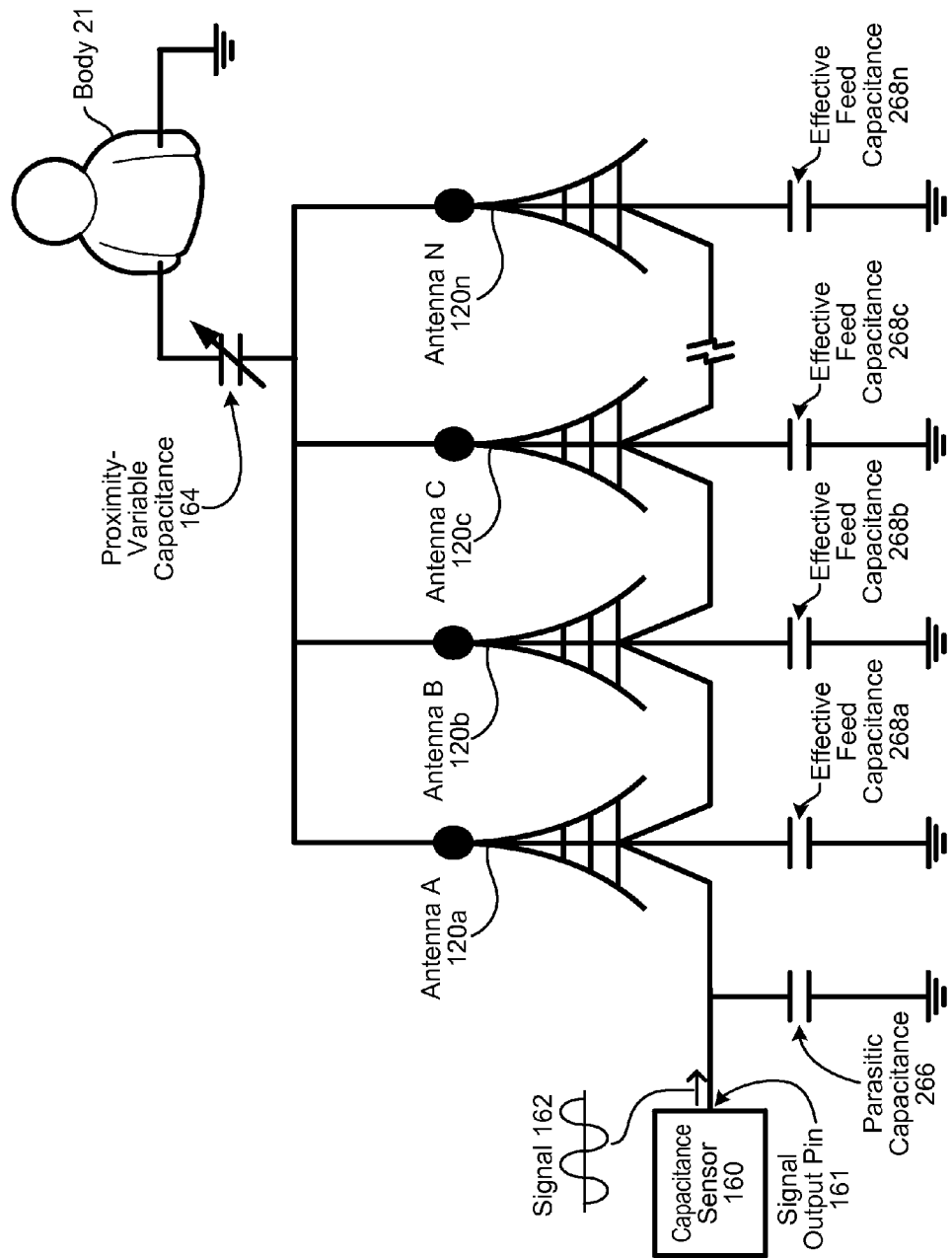
FIG. 2B demonstrates operational aspects of the circuit in FIG. 1 utilized for sensing the proximity of a human body.

At the same time, the inductances of the blocking inductors 150a to 150n provide a low impedance at the frequency of the signal 162 output by the capacitance sensor 160, approximating "closed" circuits that allows the signal 162 to "pass" through. This is illustrated in FIG. 2B, where the low impedance of the blocking inductors 150a to 150n provides a clear conductive pathway (or at least, a low attenuation pathway) for the signal 162, passing the signal 162 from antenna-to-antenna. As used herein, a component is "passing" an applied signal if the component outputs the applied signal with at least 20 dB of the original strength of the signal as input. Since "blocking" and "passing" are frequency dependent, a blocking component (e.g., blocking inductors 150a to 150n) may substantially attenuate (i.e., attenuate by at least 20 dB) some frequencies of an applied signal or signals, while passing other frequencies.

Additionally, a "blocking" capacitor 140a to 140n is connected in series between each antenna feed port 130a to 130*n* and that feed port's corresponding antenna 120*a* to 120*n*. The impedance of a capacitor decreases as frequency of an applied signal increases, as well as with increasing capacitance. The values of these blocking capacitors 140*a* to 140*n* are selected to present a low impedance at the frequencies of the RF signals 132*a* to 132*n*, acting as a "closed" circuit. This is illustrated in FIG. 2A, where the low impedance of the blocking capacitors 140*a* to 140*n* provide clear pathways (or at least, low attenuation pathways) for the RF signals 132*a* to 132*n*, passing the RF signals 132*a* to 132*n* from feed port-to-antenna (transmissions) and from antenna-to-feed port (reception).

At the same time, the capacitances of the blocking capacitors 140*a* to 140*n* provide a high impedance at the frequency of the signal 162 output by the capacitance sensor 160, approximating an "open circuit" and thereby "blocking" the path of the signal 162 (providing no pathway or a highly attenuated pathway), thus preventing the signal 162 from entering the RF feed ports 130*a* to 130*n*. This is illustrated in FIG. 2B, where RF feed ports 130*a* to 130*n*, where the RF feeds are omitted from the pathways available to signal 162.

However, while the blocking capacitances 140*a* to 140*n* block the signal 162, circuitry coupled to the feed ports 130*a* to 130*n*, including the block capacitors 140*a* to 140*n*, still contribute to the intrinsic capacitance on the output of the capacitance sensor 160. The intrinsic capacitance is the capacitance on the signal output pin/electrode 161 of the capacitance sensor 160 when a proximity-variable capacitance 164 is at a minimum level (e.g., zero picofarads when the body 21 is far away from the mobile device 100).

The contribution of the blocking capacitors 140 to the intrinsic capacitance is not necessarily a one-for-one ratio, but rather is a cumulative contribution of circuitry coupled to the feed ports 130*a* to 130*n*, represented in FIG. 2B by the effective feed capacitances 268*a* to 268*n* coupled between a corresponding antenna 120*a* to 120*n* and "ground." "Ground," in terms of a mobile computing device is not necessarily the same as the "Earth" ground found in ordinary electrical wall outlets, but rather is a reference voltage level from which other voltages in the circuit are measured (e.g., zero volts). With the inclusion of impedance matching circuits in a feed, the effective feed capacitances 268*a* to 268*n* tend to be approximately equal to or smaller than the corresponding blocking capacitor 140*a* to 140*n*.

Another source of this intrinsic capacitance is a parasitic capacitance 266 between the various wires and circuit components connected to the signal output pin/electrode 161 of capacitance sensor 160 and other electrically conductive components in the mobile device, such as a metal housing of the device, other nearby circuits, etc. In a device with a metal housing, the antennae will be proximate to housing, with a typical separation between each antenna and the housing being within 1 mm to 2 mm. In general, "parasitic" capacitance occurs due to the proximity of two conductors where there is a difference in potentials between conductors and an electric field in one conductor interacts with an electric field in the other conductor (and vice-versa), causing the opposing conductor to store an opposite electric charge like a capacitor. Parasitic capacitances attenuate RF energy and reduce efficiency. The contribution of parasitic capacitance 266 to the antennae feed circuits is ordinarily minimized in existing mobile devices, such that techniques for minimizing the parasitic capacitance 266 are commonly applied when designing existing mobile devices. This parasitic capacitance 266 may be determined as a separate value relative to the effective feed capacitances 268 by disconnecting feeds from the antennae 120 from the blocking capacitors 140.

The ability of the capacitance sensor 160 to sense changes in the proximity-variable capacitance 164 is affected by both intrinsic capacitances and by the proximity-variable "body" capacitance 164. In circuit terms, these capacitances are in parallel, such that they can be added together to determine the total capacitance on the signal output pin/electrode 161 of the capacitance sensor 160. A conventional commercially available capacitance sensor 160 (e.g., a capacitance-to-digital converter such as an Analog Devices AD7146) can typically tolerate around twenty to forty picofarads of intrinsic capacitance (~20-40 pF) while still being able to reliably sense changes to the proximity variable capacitance 164 (which increases as a body 21 approaches).

In a mobile device that has an electrically conductive housing/chassis, the parasitic capacitance 266 can be kept low (e.g., below 10 pF) by including space and/or electrical insulators between the various circuit components, the housing, and other electrically conductive components. Parasitic capacitances 266 with values around 3 to 4 pF are readily achievable, making the parasitic capacitance 266 inconsequential to detecting the proximity of the body 21.

However, although the contribution of the blocking capacitors 140 to the effective feed capacitances 268 is not necessarily one-for-one, it is advantageous to minimize the capacitances of the blocking capacitors 140. At the same time, the capacitances of each blocking capacitor 140 needs to be large enough to pass the associated RF signals 132.

As the impedance of a capacitor decreases with increasing frequency of an applied signal, there is a reciprocal relationship between the size of the blocking capacitor 140 needed and the signal frequencies of the feed: the higher the frequency of the RF signal, the smaller the blocking capacitor 140 can be. Conversely, feeds used for lower RF frequencies require larger capacitance blocking capacitors 140 in order to pass the associated RF signal. Thus, the blocking capacitor 140 of a feed that operates in the lowest frequency band may be the largest contributor to the intrinsic capacitance.

Also, since the parasitic capacitance 266 and the effective feed capacitances 268*a* to 268*n* add together to determine the intrinsic capacitance, the intrinsic capacitance tolerance (e.g., 20-40 pF) of the capacitance sensor 160 may limit the total number of antennae 120/feeds ports 130 that may be coupled together to serve as the unified proximity sensor. As it is easier to minimize the effective feed capacitance 268 of a high-frequency feed than a low-frequency feed, the upper limit on the number of antennae/feed circuits that may be included in a unified proximity sensing circuit depends in part on the operational frequency bands of the coupled transceivers/transmitters/receivers, antennae 120, and feeds/feed ports 130.

As noted above, the capacitance sensor 160 detects variable "body" capacitance 164 (among other ways) by measuring fluctuations in the time it takes for the proximity signal 162 to reach a specific voltage, with the time delay increasing as capacitive coupling to the body 21 increases. The capacitance sensor 160 converts this time delay into a digital number (i.e., digital value 163) that corresponds to the variable capacitance on the signal output pin/electrode 161. For example, the capacitance sensor 160 may be a capacitance-to-digital converter that provides a sixteen-bit digital output value based on the time delay on the signal output pin/electrode 161. A sixteen-bit number provides 65,536 possible values (two to the power of sixteen).

The time delay on the output pin/electrode 161 due to the load capacitance on the pin/electrode 161 may be measured (among other ways) in terms of clock cycles of a synchronous "clock" signal used by capacitance sensor 160 to measure time. As such, the digital value 163 that corresponds to the variable capacitance 164 may be a "count" of how many clock cycles correspond to the time delay, with the count having (if the output is sixteen bits) a value between zero and 65,535.

The capacitance sensor 160 may be calibrated so that the intrinsic capacitance is not included in the digital output value 163 (e.g., configuring the capacitance sensor 160 to output a "count" of zero when only intrinsic capacitance is connected to the pin/electrode 161), or the intrinsic capacitance may act as a "floor" on the digital output (e.g., if the intrinsic capacitance results in a time delay producing a count of 10,000, then the resolution of the proximity-variable capacitance 164 is limited to a value range of 10,001 to 65,535).

The contribution of the intrinsic capacitance to the output value 163 (e.g., a "count" value) may be determined during factory calibration when a device fabricated, and may vary someone between devices due to variation in materials and tolerances. This device-specific calibration value may be referred to as an "infinity" measurement, as it is determined when the body 21 is not present. At a device level, the proximity measurement is thus composed of two separate readings: the infinity measurement (i.e., the device-dependent intrinsic capacitance) and the proximity-variable capacitance 164.

It is the difference between intrinsic capacitance and the variable capacitance 164 that corresponds to the "proximity" value that is compared to one or more threshold levels used as triggers to reduce (and restore) transmitter power to assure regulatory compliance. If the capacitance sensor 160 outputs a "raw" value as the digital value 163, such that the infinity measurement provides the "floor" value (e.g., zero to 10,000 of resolution corresponding to the intrinsic capacitance), then the infinity measurement may be subtracted from the raw value prior to comparing the proximity value to the thresholds. By subtracting the device-dependent infinity measurement (i.e. the intrinsic capacitance component) before comparing the output value of the capacitance sensor 160 to the trigger thresholds, common thresholds may be programmed/set across devices that exhibit different intrinsic capacitance (e.g., due to variation in manufacturing and component tolerances). After the infinity measurement is determined for a particular device during factory calibration, the device may be stored on the infinity measurement within the capacitance sensor 160 and/or in read-only memory or similar non-volatile storage (e.g., by selectively setting on-chip fuses to permanently store the value).

The infinity measurement may be subtracted either before or after the digital value 163 is output from the capacitance sensor 163. A functionally equivalent alternative includes adding the infinity measurement to the threshold values (comparing the result with a raw digital output value of the capacitance sensor). Another alternative is to include a mask read-only-memory (ROM) between the digital output 163 of the capacitance sensor and the component comparing the output value to the thresholds, with the mask ROM programmed with a look-up table (when the device is calibrated) to remove the infinity measurement from the capacitance sensor's raw output value. If addition or subtraction operations are performed during device operation, such operations may be performed by programmed processor operation and/or by dedicated circuits as known in the art.

Mask ROM may be pre-programmed to apply other transformations to the output value 163, such as converting a "count" into a numeric capacitance, converting a non-linear output value into a linear value, converting an output value into a distance (between the body and the proximity sensor), etc. Such conversions are not necessary to the operation of the device 100, but allow a same design/structure to be easily adapted for capacitance sensors 160 from different manufacturers. However, if the comparison between the output value 163 of the capacitance sensor 160 and the thresholds is performed by a software or firmware programmed processor (as compared, for example, to one or more digital comparators), application of any transforms, subtractions, etc., may be performed by programmed operations on the processor. As an alternative, mask ROM may be preprogrammed to produce the results of the comparison operation, such that digital values above a threshold result in a different mask ROM output value than values below the threshold (i.e., the mask ROM acts as a pre-programmed digital comparator).

In any case, either the raw or converted digital output value from the capacitance sensor 160 is provided to a processor programmed to act as digital comparator (or comparators), or to digital comparator (or comparators) circuits which compare the output value 163 with one or more thresholds. A digital comparator takes two binary numbers and determines whether one number is greater than, less than, or equal to the other number. The thresholds (e.g., set count values) are set based on trigger distances between the body 21 and the conductor(s) forming the proximity sensor (e.g., antennae 120). When the digital value 163 exceeds a threshold, the digital comparator instructs one or more of the radio transmitters connected to the RF feed ports 130 to reduce the power of the applied RF signal 132 (sometimes referred to as "backing off" power). Likewise, when the digital value 163 falls below a threshold, the radio transmitter(s) is instructed to increase power. The thresholds used to increase and decrease power may be the same, or hysteresis may be provided so that the distance at which power is restored is greater than the distance at which power is reduced (e.g., power is reduced when the body 21 is within 15 mm, but is not restored until the body is at least 16 mm away).

Multiple thresholds may be provided to control transmitter power. For example, power may be reduced when the body 21 comes within 15 mm, reduced further at 10 mm, and further again at 5 mm. Also, since transmitters operating in different frequency bands may use different amounts of transmission power and have different SAR results, transmitters may be controlled independently. For example, a low band transmitter may use a single step of power reduction for SAR compliance, whereas a high band transmitter may reduce power in multiple steps (i.e. based on multiple thresholds).

The increase of the proximity-variable capacitance caused by a decrease in the distance between the proximity sensor and the body 21 is non-linear, and may increase exponentially. The digital value 163 output by the capacitance sensor 160 may convey this non-linearity, the capacitance sensor 160 may apply a conversion to the non-linear value to increase the resolution of the digital output when the body 21 is close to proximity sensor, etc.

As illustrated in FIG. 1, the lowest frequency RF feed (Feed port a 130a receiving RF signal a 132a) is shown as being closest to the capacitance sensor 160 and the highest frequency RF feed (Feed port n 130n receiving RF signal n 130n) is shown as furthest away. The illustrated ordering of the feed frequencies is an arbitrary example, and any ordering of feed frequencies may be used with the unified proximity sensing circuit. For example, instead of low-tohigh frequency feeds, the arrangement can be high-to-low, or any arbitrary or randomized arrangement of feed frequencies.

Figure 3:
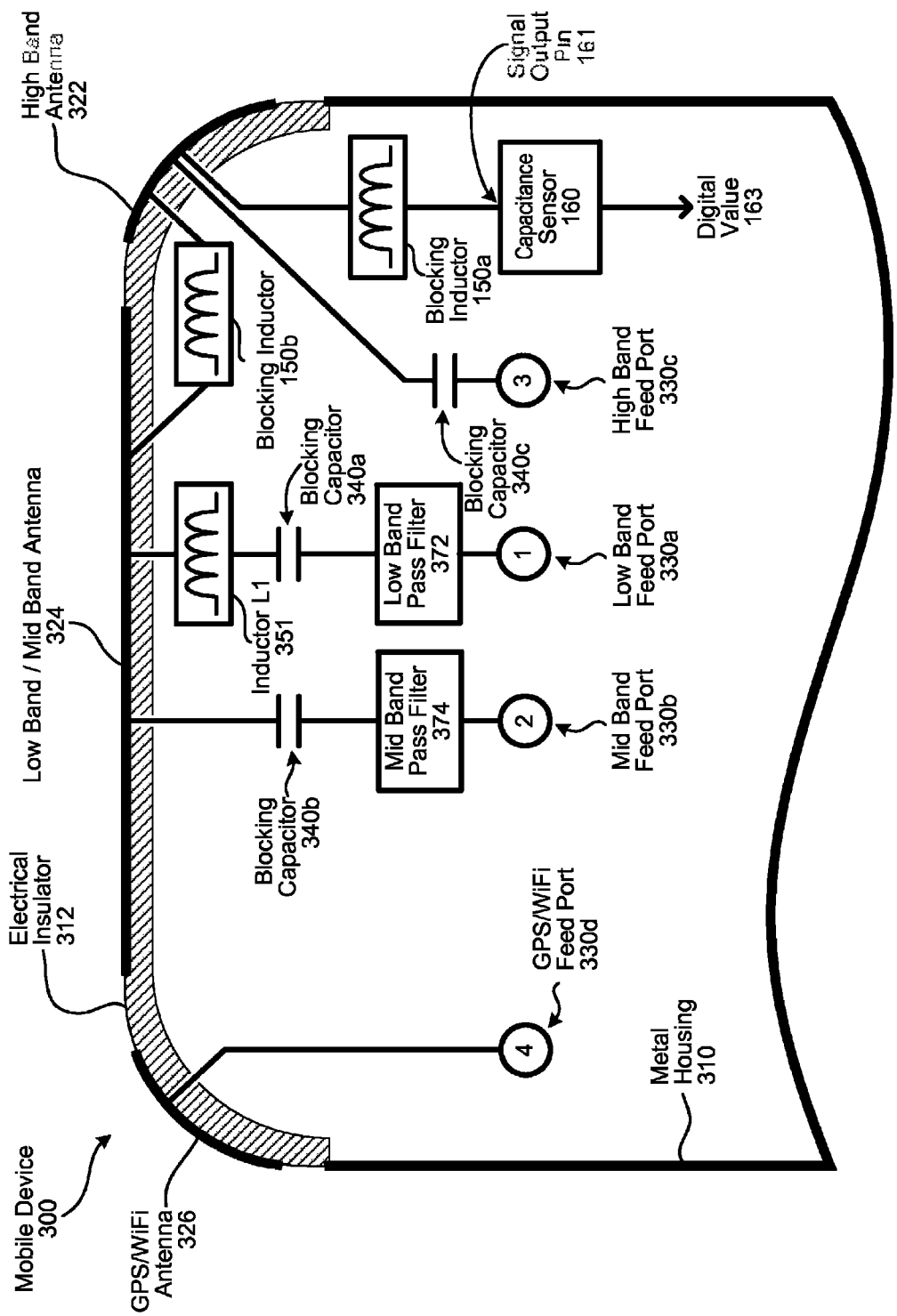
FIG. 3 illustrates an example of the circuit integrated into a mobile computing device.

FIG. 3 illustrates an example of a circuit including the unified proximity sensor from FIG. 1 integrated into a mobile computing device 300. As illustrated, the mobile device 300 has a metal housing 310, as metal housings pose particular challenges when integrating proximity sensors (e.g., the structural difficulties involved in accommodating sensors in the space around antennae, as discussed above). However, any housing material may be used, such as electrically non-conductive plastic, carbon fiber, etc. Differences in housing materials may result in different parasitic capacitances 266, with electrically non-conductive housing materials typically reducing the parasitic capacitance 266.

In this example, the unified proximity sensing circuit includes two antennae: a combined low-band and mid-band antenna 324 and a high band antenna 322. A third antenna 326 for GPS and WiFi is also illustrated, but in this example the third antenna is not included as a part of the unified proximity sensor. An electrical insulator 312 separates the antennae from each other and from the metal housing 310, such that there are no electrically conductive pathways between the antennae and the metal housing 310. As noted above, each antennae may be within 1 cm to 2 mm of the metal housing 310, with the electrical insulator 312 (e.g., non-conductive plastic) being arranged there between. Although illustrated as a single electrical insulator 312, different antennae may be insulated by different insulators. The antennae 322, 324, and 326 and the metal housing 310 may be machined or cut from a same piece of metal, or the antennae 322, 324, 326 may be manufactured separately. The size, proportions, and spacing of the insulator(s) 312 and the antennae in the figures are for the purpose of demonstration, and are not drawn to scale.

Combining low band, mid band, and high band antennae with a single unified proximity sensor is particularly advantageous in mobile devices that use three component-carrier carrier aggregation (3 CC-CA), as may be used by mobile devices that support (for example) the LTE-Advanced communications standard. In a CC-CA system, multiple bands are aggregated (i.e., used at a same time) to increase the data rate at which information can be communicated. As any or all three bands may be transmitting at a same time using CC-CA, it can be particularly difficult to pass the coverage tests if proximity sensors were provided for each antenna. Among other issues, in addition to increasing device costs, the difference in responsiveness between different sensors and differences in proximity detection from different angles can be laborious to optimize. In comparison, the unified proximity detection circuit provides consistent responsiveness for all antennae, reduces device costs, and requires less surface space on the exterior of the housing 310.

The device 300 includes a low band feed port 330a, a mid-band feed port 330b, a high band feed port 330c, and a GPS/WiFi feed port 330d. The low band feed port 330a is connected to the combined low band/mid-band antenna 324 via a low band pass filter 372, a blocking capacitor 340a, and an inductor L1 351. The blocking capacitor 340a blocks the signal 162 output by the capacitance sensor 160 while passing the low band RF frequencies. The low band pass filter 372 may also be an impedance matching circuit for the low band feed port 330a, or a combined filter and impedance matching circuit. Impedance matching circuits maximize power transfer between the port and the antenna, and may also reduce reflection of transmission signals back into the port.

The inductor L1 351 blocks (e.g., substantially attenuates) energy in the mid-band frequencies from travelling through the shared antenna 324 down the low band feed, which would lower the efficiency of the mid-band resonance. While the inductor L1 351 is illustrated between the low band/mid-band antenna 324 and the blocking capacitor 340a, it may be arranged elsewhere in series between the blocking capacitor 340a and the low band feed port 330a, either as a discrete component or integrated into the low band pass filter 372.

The mid-band feed port 330b is connected to the combined low band/mid-band antenna 324 via a mid-band pass filter 374, and a blocking capacitor 340b. The blocking capacitor 340b blocks the signal 162 from the proximity sensor sensing circuit while passing the mid-band RF frequencies. The mid band pass filter 374 may also be an impedance matching circuit for the mid-band feed port 330b, or a combination of filter and impedance matching circuit.

The high band feed port 330c is connected to the high band antenna 322 via a blocking capacitor 340c. The blocking capacitor 340c blocks the signal 162 from the proximity sensor sensing circuit while passing the high band RF frequencies. Although not illustrated, the high band feed may also include a high band pass filter/impedance matching circuit.

A blocking inductor 150a is connected between the output of the signal output pin/electrode 161 of the capacitance sensor 160 and the high band antenna 322, and a blocking inductor 150b is connected between the high band antenna 322 and the low band/mid-band antenna 324. As described in connection with FIG. 1, the blocking inductors 150 allow the signal 162 output by the capacitance sensor 160 to pass, while blocking passage of the RF band frequencies. The blocking inductor 150a between the high band antenna 322 and the capacitance sensor 160 blocks energy in the high band frequencies from travelling into the signal output pin/electrode 161 of the capacitance sensor 160, which would lower the efficiency of the high band resonance and could reduce the sensitivity of the proximity sensing circuit.

Various strategies may be used to determine where to physically couple blocking inductors 150 to each antenna to minimize the influence that the blocking inductor 150 has on the RF resonance in the respective antenna. One strategy is to connect a blocking inductor 150 in proximity to an antenna's feed connections(s).

FIGS. 4A and 4B illustrate end views of the antennae structures and the electrical insulator 312 relative to the metal housing 310. FIG. 4A is a view from the front of the device 300, where the glass 414 of a display acts as an insulator along a front-edge of the antennae 322, 324, and 326. Electrically non-conductive plastic may be used instead of glass. FIG. 4B is a view from the back of the device 300, where the metal housing 310 on the back and sides of the device are separated from the antennae 322, 324, and 326 by the electrical insulator 312. Other features of the device 300 that are not needed to explain the operation of the unified proximity sensor are omitted from these figures for brevity, such as input/output jacks, buttons, microphone/speaker/camera openings, etc.

FIG. 5 illustrates another example of a circuit including the unified proximity sensor from FIG. 1 integrated into a mobile computing device 500. The difference between the device 300 in FIG. 3 and the device 500 in FIG. 5 is that the low band feed and the mid-band feed share a physical connection to the low band/mid-band antenna 324. An inductor L1 551 is included in series between the low band feed port 330a to block (e.g., substantially attenuate) energy in the mid-band frequencies from travelling down the low band feed, which would lower the efficiency of the mid-band resonance. While the inductor L1 551 is illustrated between the blocking capacitor 340a and connection to the mid-band feed, it may be arranged elsewhere in series between the blocking capacitor 340a and the low band feed port 330a, either as a discrete component or integrated into the low band pass filter 372.

Figure 6:
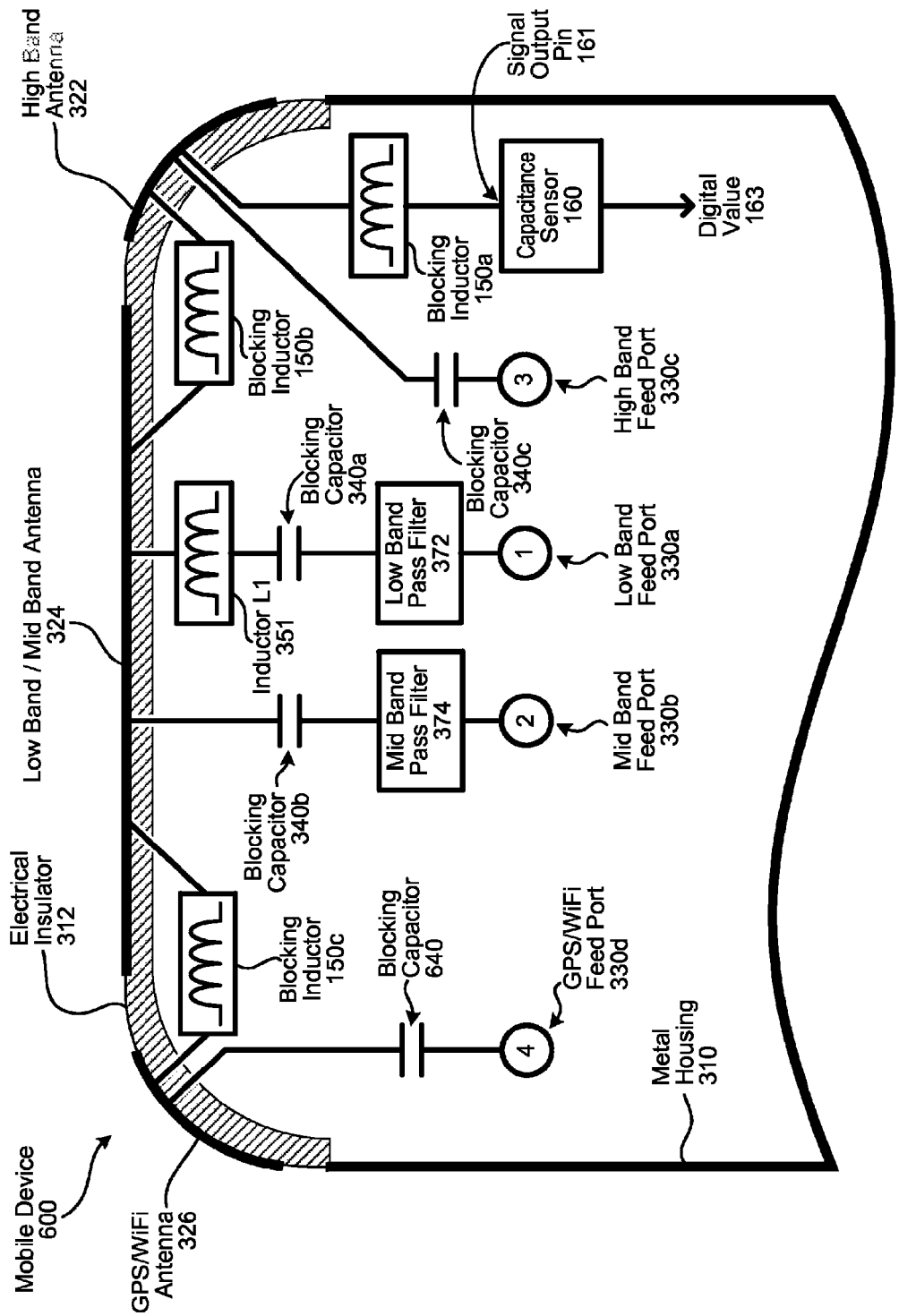

FIG. 6 illustrates another example of a circuit including the unified proximity sensor from FIG. 1 integrated into a mobile computing device 600. The difference between the device 300 in FIG. 3 and the device 600 in FIG. 6 is that the GPS/WiFi antenna 326 is included as part of the unified proximity sensor, adding a blocking capacitor 640 between the GPS/WiFi feed port 330d and the GPS/WiFi antenna 326, and a blocking inductor 150c connected between the low band/mid-band antenna 324 and the GPS/WiFi antenna 326. The blocking capacitor 640 blocks the signal 162 from entering the GPS/WiFi Feed 330d while passing the GPS and WiFi RF frequencies. Although not illustrated, the GPS/WiFi feed may also include a band pass filter/impedance matching circuit.

Figure 7A:
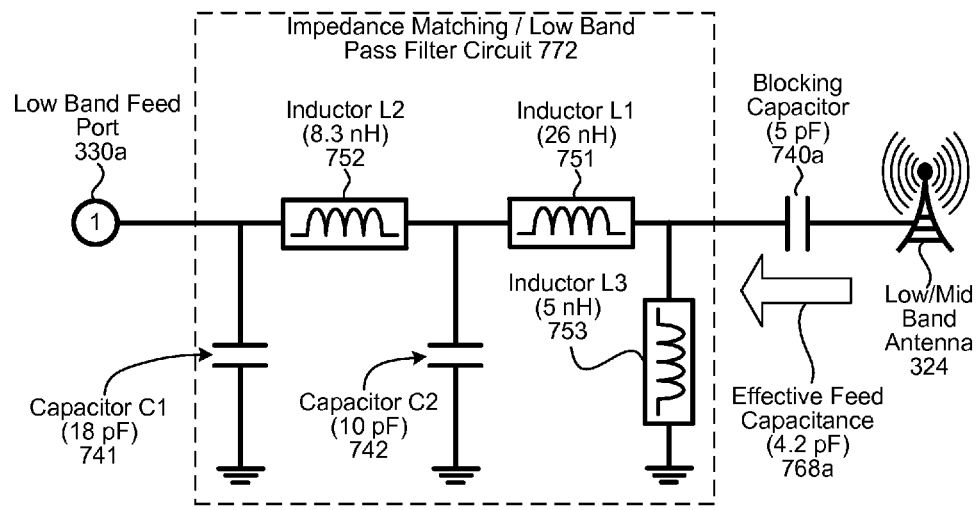
FIGS. 7A to 7C illustrate an example embodiment of circuits illustrated in FIG. 3.
Figure 7B:
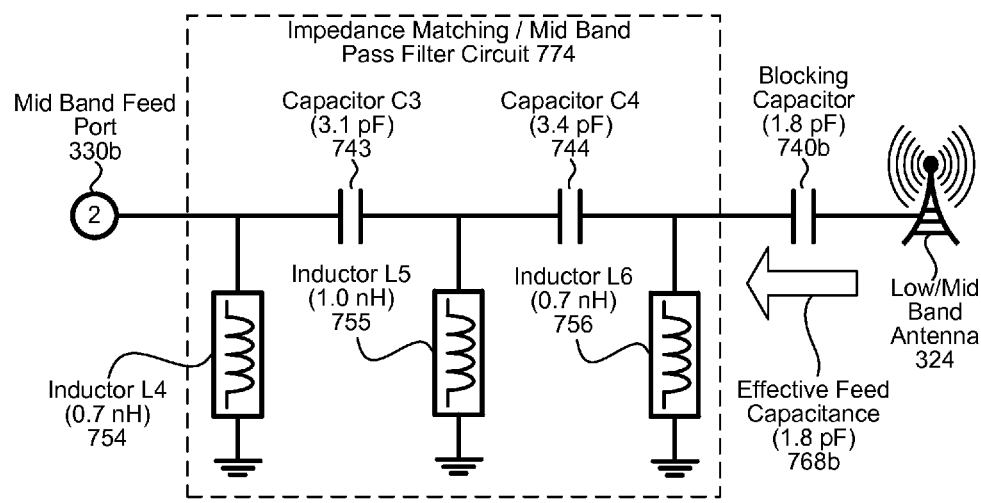
Figure 7C:
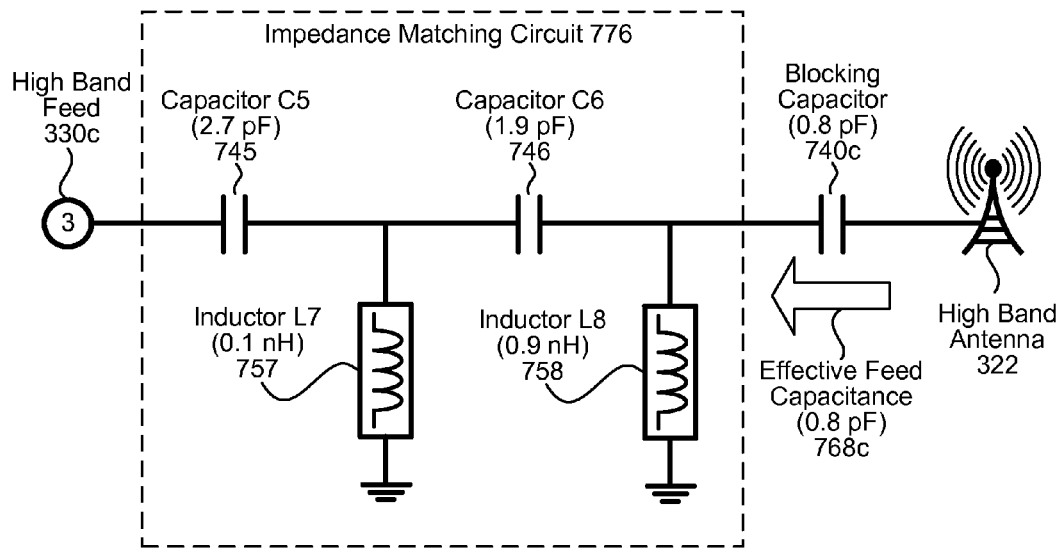
Figure 8:
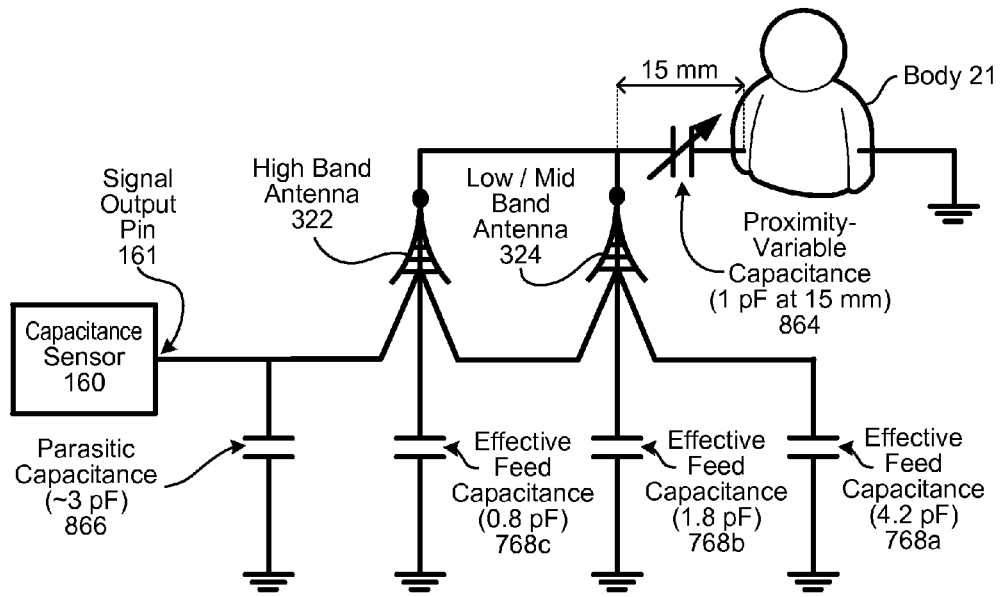
FIG. 8 illustrates operational aspects related to proximity sensing utilizing the example embodiment in FIGS. 7A to 7C.
Figure 9:
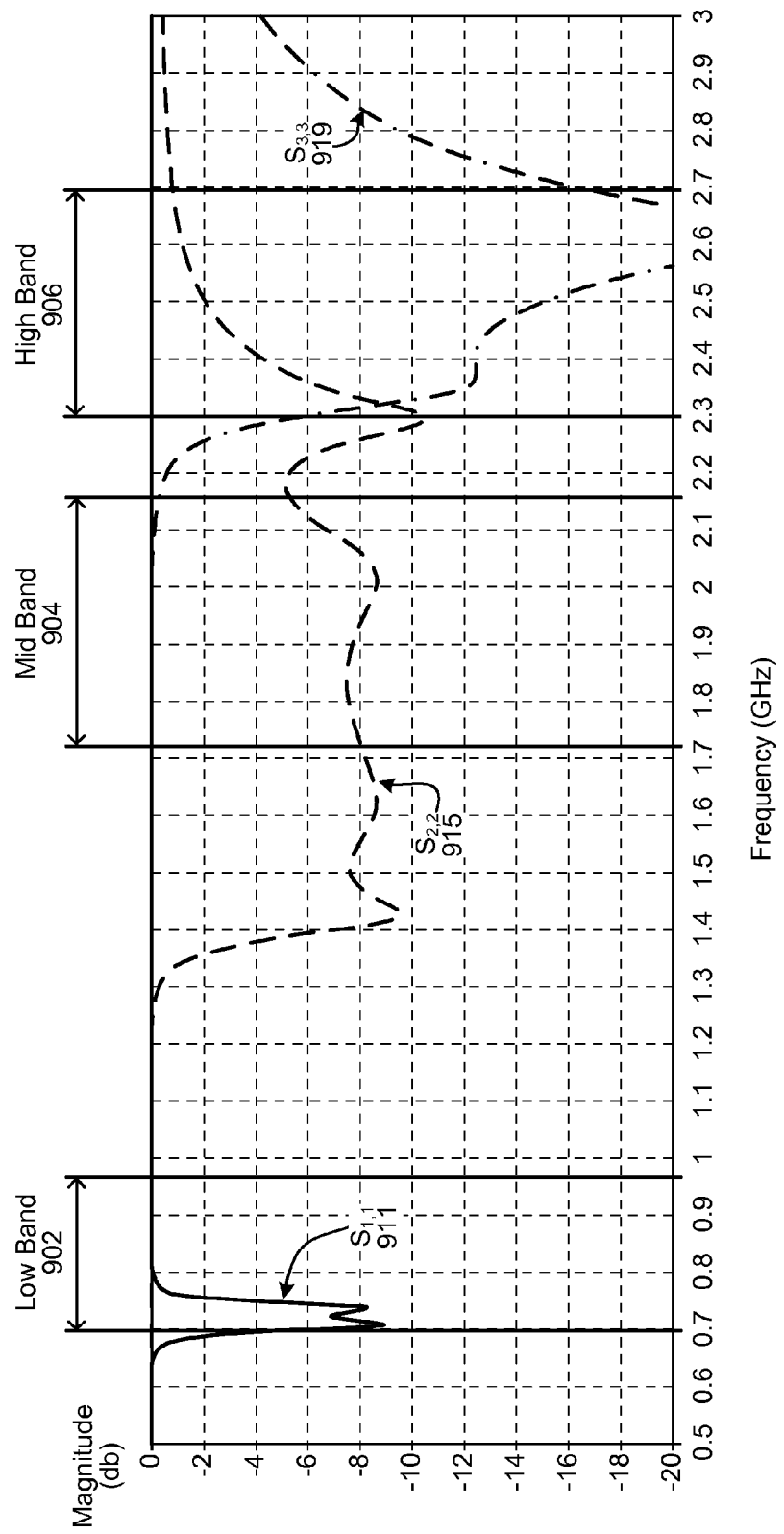
FIG. 9 is a simulated scattering parameter (S-parameter) chart illustrating performance characteristics of example embodiment in FIGS. 7A to 7C.
Figure 10:
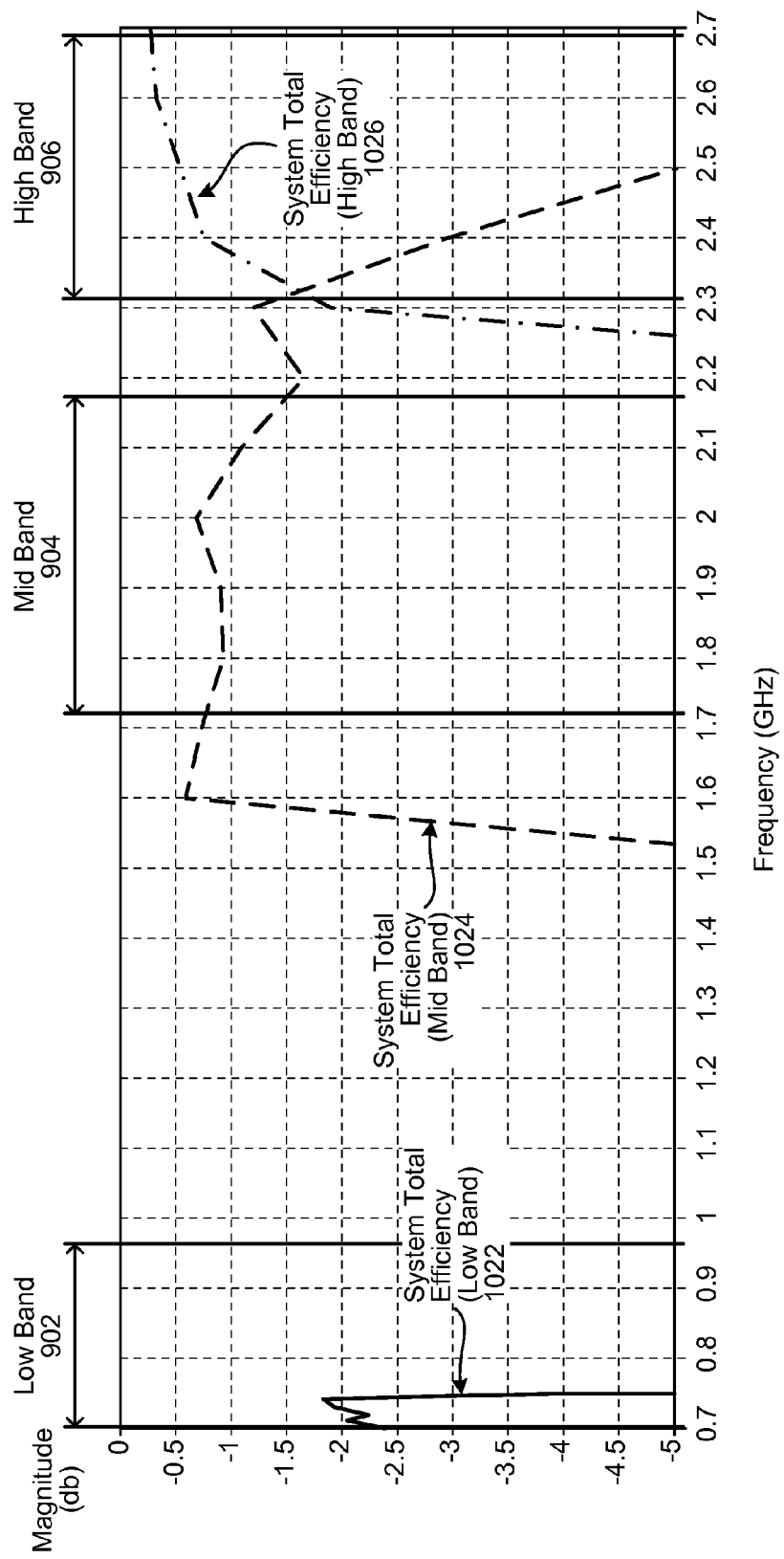
FIG. 10 is a simulated system efficiency chart illustrating efficiency characteristics of the example embodiment in FIGS. 7A to 7C.
Figure 11:
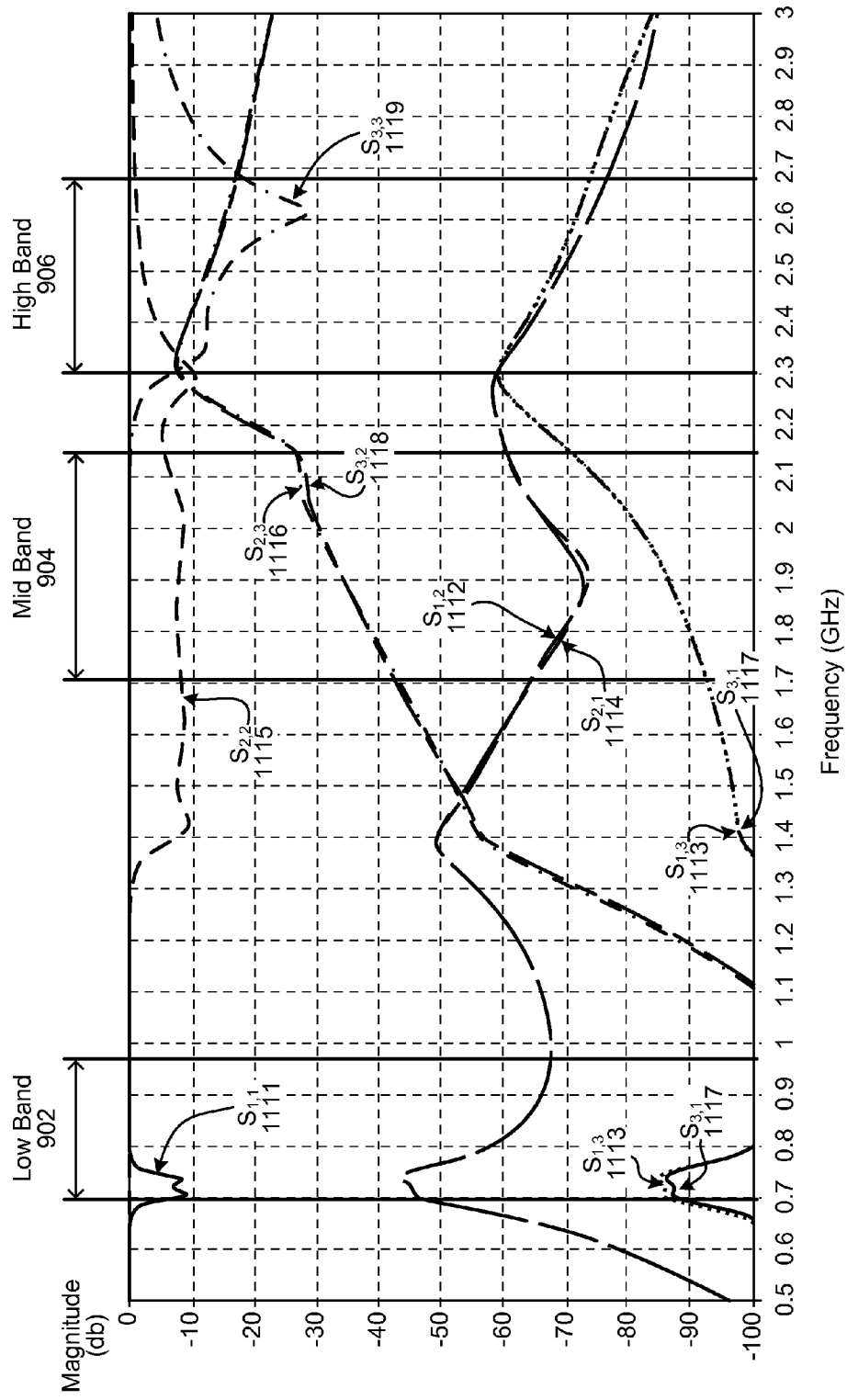
FIG. 11 illustrates simulated couplings between the RF antennae feed ports of the example embodiment in FIGS. 7A to 7C.

FIGS. 7A to 7C illustrates an example of a specific embodiment of the circuit elements in the device 300 in FIG. 3. Proximity sensor capacitance values of the specific embodiment are illustrated in FIG. 8, and simulated results for the specific embodiment are illustrated in FIGS. 9 to 11. Although not illustrated in FIGS. 7A to 7C, the blocking inductors 150 in this specific embodiment have an inductance of 120 nH (nanohenries). The antennae are configured for LTE cellular radio operation, with a low band range from 699 MHz to 960 MHz (902), a mid-band range from 1710 MHz to 2,170 MHz (904), and a high band range from 2,305 MHz to 2,690 MHz (906). The signal 162 output by the capacitance sensor 160 is 100 kHz.

In FIG. 7A, the blocking capacitor 740a on the low band feed has a capacitance of 5 pF (picofarads). Within an impedance matching/low band pass filter circuit 772 are three inductors (L1, L2, and L3) and two capacitors (C1 and C2). One of these inductors (L1 751) corresponds to the inductor L1 351 in FIG. 3 used to prevent mid-band resonance down the low band feed.

A first terminal of the inductor L1 751 is connected to the blocking capacitor 740a and a second terminal of the inductor L1 is connected to a first terminal of the inductor L2 752. The inductor L1 has an inductance of 26 nH (nanohenries). The second terminal of the inductor L2 752 is connected to the low band feed port 330a. The inductor L2 752 has an inductance of 8.3 nH. A first terminal of the capacitor C1 741 is connected to the second terminal of the inductor L2 752 and a second terminal of the capacitor C1 is connected to ground. The capacitor C1 741 has a capacitance of 18 pF. A first terminal of the capacitor C2 742 is connected to the second terminal of the inductor L1 and the first terminal of the inductor L2, and a second terminal of the capacitor C2 is connected to ground. The capacitor C2 742 has a capacitance of 10 pF. A first terminal of the inductor L3 753 is connected to the first terminal of the inductor L1, and a second terminal of the inductor L3 is connected to ground. The inductor L3 has an inductance of 5 nH. The low-band feed circuit in FIG. 7A contributes an effective capacitance of 5.0 pF (768a) to the intrinsic capacitance on the output of the capacitance sensor 160. This is the single largest contribution to the intrinsic capacitance.

In FIG. 7B, the blocking capacitor 740b on the mid-band feed has a capacitance of 1.8 pF. Within the impedance matching/mid band pass filter circuit 774 are three inductors (L4, L5, and L6) and two capacitors (C3 and C4). A first terminal of the capacitor C4 744 is connected to the blocking capacitor 740b and a second terminal of the capacitor C4 is connected to a first terminal of the capacitor C3 743. The capacitor C5 has a capacitance of 3.4 pF. A second terminal of the capacitor C3 743 is connected to the mid-band feed port 330b. The capacitor C3 743 has a capacitance of 3.1 pF. A first terminal of the inductor L4 754 is connected to the second terminal of the capacitor C3 743 and a second terminal of the inductor L4 754 is connected to ground. The inductance of the inductor L4 is 0.7 nH. A first terminal of the inductor L5 755 is connected to the second terminal of the capacitor C4 and the first terminal of the capacitor C3. A second terminal of the inductor L5 755 is connected to ground. The inductor L5 has an inductance of 1.0 nH. A first terminal of the inductor L6 756 is connected to the first terminal of the capacitor C4, and a second terminal of the inductor L6 756 is connected to ground. The inductance of the inductor L6 is 0.7 nH. The mid-band feed circuit in FIG. 7B contributes an effective capacitance of 1.8 pF (768b) to the intrinsic capacitance on the output of the capacitance sensor 160.

In FIG. 7C, the blocking capacitor 740c on the high band feed has a capacitance of 0.8 pF. Within an impedance matching 776 connected between the blocking capacitor 740c and the high band feed port 330c are two inductors (L7 and L8) and two capacitors (C5 and C6). A first terminal of the capacitor C6 746 is connected to the blocking capacitor 740c and a second terminal of the capacitor C6 is connected to a first terminal of the capacitor C5 745. The capacitor C6 has a capacitance of 1.9 pF. A second terminal of the capacitor C5 745 is connected to the high band feed port 330c. The capacitor C5 745 has a capacitance of 2.7 pF. A first terminal of the inductor L7 757 is connected to the second terminal of the capacitor C6 and the first terminal of the capacitor C5. A second terminal of the inductor L7 755 is connected to ground. The inductor L7 has an inductance of 0.1 nH which can be implemented using a distributed element. Examples of a "distributed element" include a short-length wire trace on the circuit board or a short length of copper wire, as is known in the art for providing small inductance values below those that are ordinarily commercially available (0.1 nH being such a "small" inductance). A first terminal of the inductor L8 758 is connected to the first terminal of the capacitor C6, and a second terminal of the inductor L8 758 is connected to ground. The inductance of the inductor L8 is 0.9 nH. The high band feed circuit in FIG. 7C contributes an effective capacitance of 0.8 pF (768c) to the intrinsic capacitance on the output of the capacitance sensor 160.

FIG. 8 illustrates the capacitive load on the output of the capacitance sensor 160 for the specific embodiment in FIGS. 7A to 7C, based on the discussion in connection with FIG. 2B. Parasitic capacitance 866 between the unified proximity sensor and the metal housing 310 (and other components) is approximately 3 pF. Combined with the effective feed capacitances of 4.2 pF (768a), 1.8 pF (768b), and 0.8 pF (768c), the intrinsic capacitance is approximately 9.8 pF. The intrinsic capacitance tolerance of the capacitance sensor 160 used with the specific embodiment is 30 pF, such that the intrinsic capacitance is well within tolerance.

The proximity variable capacitance 864 is 1 pF at 15 mm distance from the unified proximity sensor/antenna structure. As the body 21 gets closer, the proximity-variable capacitance increases exponentially, increasing the digital value 163 output by the capacitance sensor 160. The distance of 15 mm is the typically largest threshold distance at which the transceiver is configured to reduce transmission power for SAR compliance. For sensitivity and reliability, preferably the ratio between the proximity-variable capacitance at 15 mm is at least 0.2% of the intrinsic capacitance (i.e., better than a ratio of 2 to 1000). That is to say that the intrinsic capacitance is no more than five hundred times the proximity-variable capacitance 164 at the outer proximity detection threshold. For example, if using a proximity sensor that outputs a digital value as a "count" that is proportional to capacitance, and 0.5 pF of intrinsic capacitance corresponds to 5000 counts, the body 21 at the outer proximity threshold should produce at least a 10-count increase. A 50-count increase provides a good threshold for initially detecting proximity of the body 21 (e.g., at 15 mm). Thus, for a 0.005 pF change (0.5 pF/(5000 count/50 count)), the proximity sensor will be able to reliably detect the presence of the body within the threshold distance (e.g., 15 mm). Referring to the embodiment FIG. 8, the ratio is better than 9%.

FIG. 9 illustrates a scattering-parameter (S-parameter) chart for the specific embodiment in FIGS. 7A to 8, with troughs in the parameters $S_{1,1}$ (911), $S_{2,2}$ (915), and $S_{3,3}$ (919) demonstrating resonance in the antennae. The $S_{1,1}$ trough overlaps with the low band frequency range 902, the $S_{2,2}$ trough overlaps with the mid-band frequency range 904, and a $S_{3,3}$ trough overlaps with the high band frequency range 906.

The $S_{1,1}$ trough is relatively narrow in comparison to a width of the low band 902. This low band performance will work but is not optimal. Several choices are available to improve low band performance. The capacitors C1 (741) and C2 (742) in the impedance matching circuit 772 could be replaced with variable capacitors to provide an impedance matching "tuner" (by adjusting the variable capacitors), tuning the circuit 772 to increase low band resonance to expand low band coverage.

FIG. 10 illustrates total system efficiency of the antennae 322 and 324 in the low band (1022), mid-band (1024), and high band (1026) for the embodiment in FIGS. 7A to 8. Total system efficiencies are reasonably good and are comparable with devices that do not include the unified proximity sensor.

FIG. 11 illustrates simulated couplings of RF energy to and between low band feed port a 330a, mid-band feed port b 330b, and high band feed port c 330c in the embodiment in FIGS. 7A to 8. The illustration includes couplings $S_{1,1}$ (1111), $S_{1,2}$ (1112), $S_{1,3}$ (1113), $S_{2,1}$ (1114), $S_{2,2}$ (1115), $S_{2,3}$ (1116), $S_{3,1}$ (1117), $S_{3,2}$ (1118), and $S_{3,3}$ (1119). The isolation between parts are very good except between the mid-band feed port 330b and high band feed port 330c (i.e., $S_{2,3}$ 1116 and $S_{3,2}$ 1118), which is approximately −8 dB (decibels). Such inter-port coupling performance is not unusual in prototypes, and the −8 dB of coupling could be improved with further optimization (e.g., by optimizing the matching components for the high band antenna or for the low/mid band antenna in FIG. 7B and FIG. 7C. Or by further isolating/shielding the high band antenna 322 from the low/mid-band antenna 324, by further isolating/shielding the mid-band feed from the high band feed, by moving or better insulating components (e.g., audio jacks, power jacks) between the high band antenna 322 and the low/mid-band antenna 324 that may be facilitating inter-port coupling, etc.). The inductance value (120 nH) of the blocking inductor 150b between the high band antenna 322 and the low/mid-band antenna 324 is not believed to be a contributing factor in the $S_{2,3}$ and $S_{3,2}$ couplings, but further optimization of the position at which the leads of the blocking inductor 150b connects to the antennae might also improve these inter-port couplings.

Figure 12:
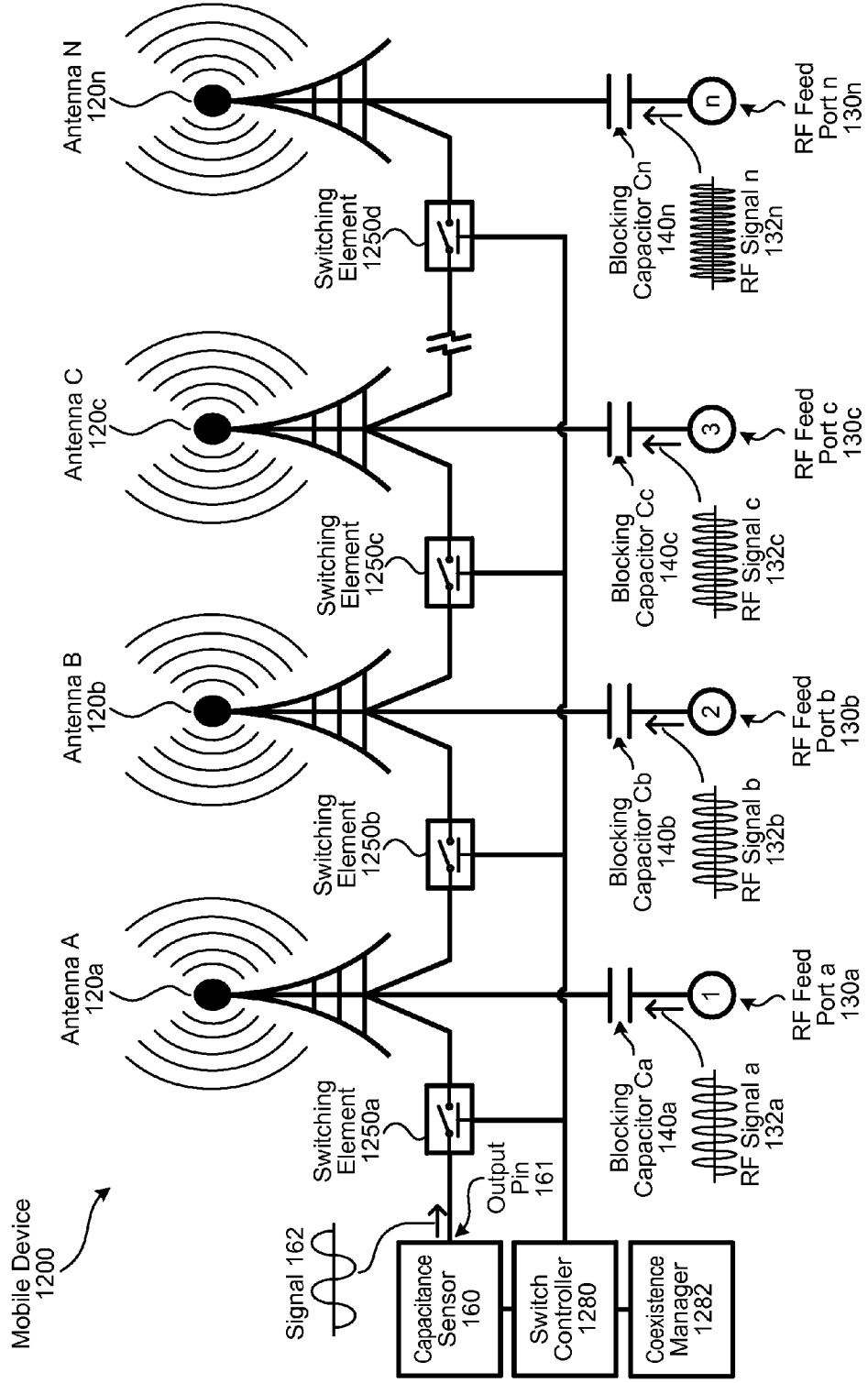
FIGS. 12 and 13 illustrate examples of alternative arrangements of the circuit in FIG. 1, substituting switching elements for signal-blocking impedance components.
Figure 13:
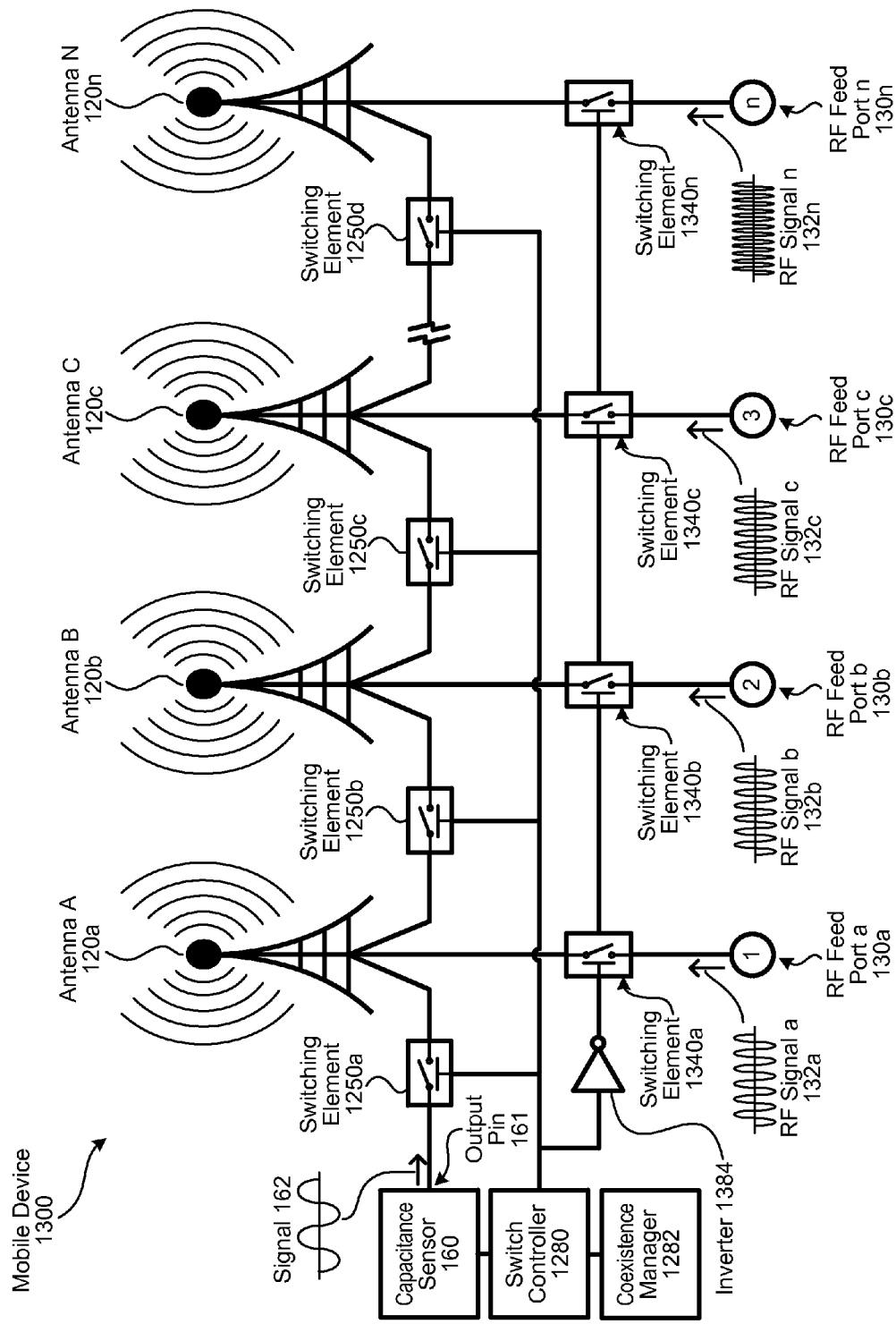

FIGS. 12 and 13 illustrate examples of alternative arrangements of the circuit in FIG. 1, substituting switching elements for signal-blocking impedance components. In most radio protocols used by mobile devices, transmission and reception time windows are established between the RF transceivers on the mobile device and the base station(s) and/or other devices with which wireless communication links have been established. The RF transceivers on the mobile device use this scheduling information to establish when each RF transceiver can transmit RF signals, and when to listen to receive RF signals. This information is commonly used by RF transceivers on mobile devices to coordinate between transceivers (e.g., coordinating between LTE, WiFi, Bluetooth, etc.) so as to reduce on-device inter-radio interference, and to selectively power down (or reduce power to) portions of the RF circuitry to conserve battery life. The component that identifies interference issues and coordinates scheduling of communications across bands, radio technologies, and RF transceivers is commonly referred to as a "coexistence manager."

In FIG. 12, the blocking inductors 150 have been replaced by solid state semiconductor switching elements 1250 (e.g., metal oxide silicon (MOS) switching circuits). Based on the scheduling information and current transceiver activity, the switch controller 1280 determines when the mobile device is neither scheduled to receive, nor receiving, nor transmitting. For example, the switch controller may comprise logic gates or programmable logic that sets a state of the switches based on a signal or signals indicating whether a transceiver is scheduled for activity or active, or not scheduled and inactive (e.g., as indicated by the coexistence manager 1282 and/or the individual transceivers).

During inactive communication intervals, the switch controller 1280 closes the switching elements 1250a to 1250n, allowing the signal 162 output by the capacitance sensor 160 to traverse the unified proximity sensor circuit. When the schedule indicates that transmissions and/or receptions are scheduled (or are ongoing), the switch controller 1280 opens the switching elements 1250, blocking the RF signals 132 from traversing between feeds. The switch controller 1280 may also indicate to the capacitance sensor 160 when the switches 1250 are opened and closed.

In a switch-based implementation, the capacitor sensor 160 can use a much higher frequency sensing signal 162, and thus its operation duration to determine the proximity variable capacitance 164 can be significantly reduced. To facilitate this, when the coexistence manager 1282 of the mobile device 1200 coordinates scheduling for the RF transceivers, bands, and radio technologies, scheduling rules may be added to assure that proximity detection intervals for the proximity sensor are regularly provided.

For example, similar scheduling rules are commonly used by coexistence managers to coordinate between radio protocols such as LTE cellular communications and Bluetooth. Various rules are applied by the coexistence manager to coordinate how often each radio technology can transmit, can receive, the minimum durations of those time windows, what level of priority should be given to each technology, etc. Configuring the coexistence manager 1282 to schedule time for the proximity sensor intervals may be accomplished by adding an additional set of rules and parameters (e.g., how many times a second time windows are needed, what the minimum duration of each time window is, and what priority should be given to the scheduling of these windows).

FIG. 13 replaces the blocking capacitors 140/340 with solid state semiconductor switching elements 1340 (e.g., metal oxide silicon (MOS) switching circuits). During proximity sensing intervals, the switching elements 1340a to 1340n are opened, blocking the signal 162 output by the capacitance sensor 160 from travelling down the RF feeds. When the RF transceivers are transmitting or receiving, and/or scheduled to be transmitting or receiving, the switching elements 1340a to 1340n are closed, such that the RF feed ports 130a to 130n are coupled to their corresponding antenna 120a to 120n. Opening the switching elements 1250 while closing the switching elements 1340, and opening the switching elements 1340 while closing the switching elements 1250 may be accomplished, among other ways, by using an inverter 1384 to invert the switch control signal from the switch controller 1280 to drive the switching elements 1340. An inverter turns a logical "true" input into a logical "false" output, and vice versa.

For further isolation, inter-feed components such as inductor L1 351 in FIG. 3 and inductor L1 551 in FIG. 5 may be supplemented or replaced solid-state switching elements. For example, when the low band is not transmitting or receiving (and/or is not scheduled to), but the mid-band is transmitting or receiving (and/or is scheduled to), a switching element between the low band and the mid-band feed can be opened to further isolate the low and mid-band feeds.

Figure 14:
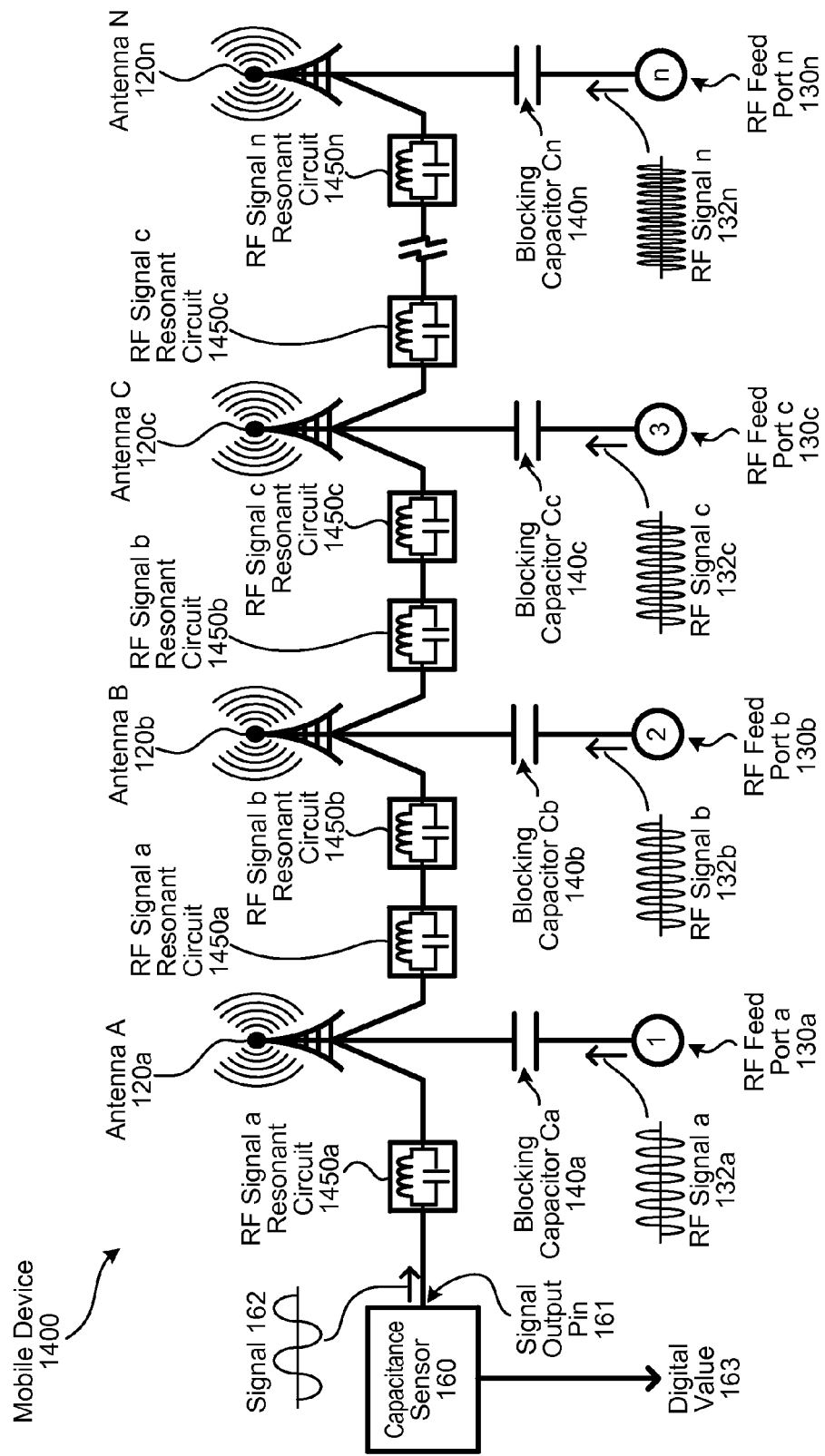
FIG. 14 illustrates another example of an alternative arrangement of the circuit in FIG. 1, substituting resonant circuits for signal-blocking impedance components.

In FIG. 14, the blocking inductors 150 are replaced with resonant circuits 1450. An example of a resonant circuit 1450 is a parallel inductor-capacitor circuit called a "tank circuit," although any resonant circuit may be used. Resonant circuits "resonate" at a particular frequency or range of frequencies. Signals at the resonant frequency or range of frequencies are blocked (e.g., substantially attenuated) from passing through the resonant circuit, whereas other frequencies pass through.

As illustrated in FIG. 14, a resonant circuit 1450 is provided on each side of an antenna feed to block that feed's RF signal from travelling into an adjacent feed and the capacitance sensor 160. Although illustrated as a single resonant circuit per band, several resonant circuits may be connected in series (i.e., "cascaded") to block signals across an entirety of a frequency band. Each resonant circuit in a cascaded configuration resonates at (and blocks) a portion of the blocked band. By arranging each resonant circuit 1450 in a cascade so that resonance overlaps portions of the band blocked by other resonant circuits within the cascade, a cascade can provide fairly uniform attenuation across the blocked band. Also, while parallel inductor-capacitor tank circuits are an example of a resonant circuit, any resonant circuit that can be configured to selectively block a frequency or range of frequencies may be used.

As illustrated, a resonant circuit or circuits 1450a are connected on each side of the RF feed tied to Antenna A (120a), allowing the proximity signal 162 to pass through while blocking the RF signal a 132a. A resonant circuit or circuits 1450b are connected on each side of the RF feed tied to Antenna B (120b), allowing the proximity signal 162 to pass through while blocking the RF signal b 132b. Between antenna A 120a and antenna B 120b, the resonant circuits 1450a and 1450b are connected in series. A resonant circuit or circuits 1450c are connected on each side of the RF feed tied to Antenna C (120c), allowing the proximity signal 162 to pass through while blocking the RF signal c 132c. Between antenna B 120b and antenna C 120c, the resonant circuits 1450b and 1450c are connected in series. And so on.

Although not illustrated, resonant circuits may also be substituted for the blocking capacitors 140/340. In that arrangement, each resonant circuit is tuned to block the proximity signal 162, while allowing other frequencies to pass (e.g., the RF signals 130a to 130n).

Blocking components may be combined in a variety of ways. For example, the blocking inductor 150, the switching elements 1250, and the resonant circuits 1450 used to pass the proximity signal 162 and block the RF signals 132 are interchangeable, and a different type of blocking element may be used between the capacitance sensor 160 and the first antenna in the chain (e.g., antenna A 120a) then is used between the RF feeds. Likewise, the blocking capacitors 140/340/640, switching elements 1340, and resonant circuits (not illustrated) used to pass the RF signals 132 and block the proximity signal 162 are interchangeable. For example, a switching element may be used to replace inter-feed components such as inductor L1 351/551, while capacitors 140/340/640 are used to block the proximity signal 162 from travelling down the feeds. Also, switching elements 1340 or resonant circuits may be used as the proximity-signal blocking elements for some feeds (e.g., low frequency feeds), while capacitors 140/340 may be used on other feeds (e.g., higher frequency feeds).

FIG. 15 is a block diagram conceptually illustrating example components of a device 1500, such as devices 100, 300, 500, 600, 1200, 1300, and 1400. In operation, the device 1500 may include computer-readable and computer-executable instructions that reside on the device 1500, as will be discussed further below.

As illustrated, device 1500 includes four antennae 120a to 120d that comprise a unified proximity detector. Four antennae is an example, with the unified proximity detector comprising at least two antennae. A device may include multiple unified proximity detectors, and some antenna in the device may not be included in one (such as GPS/WiFi antenna 326 in mobile device 300/500, as illustrated in FIGS. 3 and 5, but may be included in another.

RF signal blocking elements 1550a is connected between the capacitance sensor 160 and the first antenna 120a in the unified proximity sensor chain. RF signal blocking elements 1550b to 1550d are connected in series between the feeds/antennae in the chain. Each RF signal blocking element 1550 may include a blocking inductor 150, a switching element 1250, or a resonant circuit or circuits 1450, blocking RF signals 132 while passing the proximity signal 162.

Proximity signal blocking elements 1540a to 1540d are arranged in the antenna feeds to pass the RF signals 132 while blocking the proximity signal 162. Each proximity signal blocking element 1540 may include a blocking capacitor 140/340/640/740, a switching element 1340, or a resonant circuit.

Each RF feed also includes a band pass filter and/or impedance matching circuit 1570a to 1570d (e.g., 372, 374, 772, 774, 776) which may also include a RF band pass filter. The feeds are connected to one or more RF transceivers 1512. Each transceiver 1512 includes a transmitter and a receiver. A coexistence manager 1282 may be included to coordinate schedules between radio technologies of the RF transceivers 1512. Various radio technologies may be supported by the RF transceivers, such as wireless local area networks (WLANs) (e.g., WiFi) radio, Bluetooth, and cellular technologies such as Long Term Evolution (LTE), WiMAX, GSM, WCDMA, etc.

For receive-only communications such as GPS and GLOSNOSS, a transmitter is not needed. As such, the RF transceivers 1512 may include a receiver for some bands without a corresponding transmitter.

To support switching elements, the device 1500 may also include a switch controller 1280, and may also include the inverter 1384.

Although not illustrated in FIG. 15, inter-band blocking elements (e.g., inductor L1 351/551) may also be an inductor, a switching element, or a resonant circuit or circuits, or a combination thereof. Such inter-band blocking elements may be controlled by the switch controller 1280, by control signals provided by one or both RF transceivers connected to the inter-band element (indicating when the RF transceivers tied to the inter-band element are scheduled to transmit and receive and/or are actively transmitting and/or receiving), and/or by the coexistence manager 1282 (based on the transmission/reception schedules of the RF transceivers tied to the inter-band element).

The device 1500 may include various input/output components such as a display and touch screen 1510, such a touch screen display behind the glass 414 in FIG. 4A.

The device 110 includes input/output device interfaces 1502. A variety of components may be connected through the input/output device interfaces 1502, such as the touch display 1510, a speaker, a microphone, the RF transceivers 1512, etc. The input/output device interfaces may provide data encoding and decoding services to support the various communications protocols supported by the RF transceivers 1512.

The input/output device interfaces 1502 may also include an interfaces for an external peripheral device connection such as universal serial bus (USB), FireWire, Thunderbolt or other connection protocol.

The device 1500 may include an address/data bus 1524 for conveying data among components of the device 1500. Each component within the device 1500 may also be directly connected to other components in addition to (or instead of) being connected to other components across the bus 1524. The coexistence manager 1282 may be connected to other components via the bus 1524 and/or the I/O device interfaces 1502.

The device 1500 may include one or more controllers/processors 1504, that may each include a central processing unit (CPU) for processing data and computer-readable instructions, and a memory 1506 for storing data and instructions. The memory 1506 may include volatile random access memory (RAM), non-volatile read only memory (ROM), non-volatile magnetoresistive (MRAM) and/or other types of memory. The device 1500 may also include a data storage component 1508, for storing data and controller/processor-executable instructions. The data storage component 1508 may include one or more non-volatile storage types such as magnetic storage, optical storage, solid-state storage, etc. The device 1500 may also be connected to removable or external non-volatile memory and/or storage (such as a removable memory card, memory key drive, networked storage, etc.) through the input/output device interfaces 1502.

Computer instructions for operating the device 1500 and its various components may be executed by the controller(s)/processor(s) 1504, using the memory 1506 as temporary "working" storage at runtime. The computer instructions may be stored in a non-transitory manner in non-volatile memory 1506, storage 1508, or an external device. Alternatively, some or all of the executable instructions may be embedded in hardware or firmware in addition to or instead of software.

The controller(s)/processor(s) 1504 may be programmed by executable code stored in memory 1506 and/or storage 1508 to perform the function of a digital comparator (or comparators), comparing the digital value 163 with one or more stored thresholds. Based on the comparison of the digital value 163 output by the capacitance sensor 160 with one or more stored thresholds, the controller(s)/processor(s) 1504 instructs one or more of the RF transceivers 1512 to reduce transmission power, such as reducing transmission power for SAR compliance. Likewise, power may be increased when proximity is not detected.

In the alternative, one or more digital comparators circuits (not illustrated) may compare the digital value 163 with stored and/or preset thresholds and instruct the RF transceivers to reduce transmission power, and likewise increase transmission power. Mask ROM may also be used to perform the function of a digital comparator, receiving the digital value 163 and outputting a digital control signal instructing the transceiver(s) 1512 to raise or lower transmission power. Examples of other structures that may be used to perform operate as a digital comparator include programmable array logic (PAL), a field programmable gate array (FPGA), and other programmable logic devices (PLDs).

The comparison operation may also be performed by one or more digital comparators included in the capacitance sensor 160. For example, the capacitance sensor may determine whether the proximity variable capacitance 164 is above or below a threshold value corresponding to a proximity of triggering distance, e.g. 15 mm, and output a control signal that controls the transmission power of the RF transceivers 1512 based on the outcome of the determination.

Multiple digital comparators, together with digital logic, may be used to provide multiple threshold values. The multiple threshold may provide a stepped reduction in power, and/or to provide hysteresis. An example of hysteresis is to indicate to reduce power when a body is detected at 15 mm or less, but not indicate to restore power until the body is at least 16 mm away based on the proximity variable capacitance 164. Hysteresis may be implemented by digital comparators with additional circuitry such as a bistable multivibrator (also known as a flip-flop), with one comparator triggering the multivibrator to signal a reduction in transmitter power, and another comparator triggering the multivibrator to signal an increase in power. As noted, with or without hysteresis, comparisons may be performed with multiple thresholds to provide a progressive back-off in steps as the body 21 comes closer to the unified proximity sensing circuit.

Although discussed as a digital operation, the comparison of the variable capacitance with the threshold value(s) to determine a state of the control signal used to control RF transmitter power may be performed in either analog or digital domains. For example, an analog domain approach is to compare a voltage corresponding to the variable capacitance 164 with a threshold voltage value using a comparator. An example of a digital domain approach is to have a processor (e.g., executing software or firmware) or a digital comparator compare a numeric value corresponding to the variable capacitance 164 with numeric threshold value(s).

Instead of a threshold-based approach, the capacitance sensor 160 may output a value 163 based on the proximity variable capacitance 164 to controller(s)/processors 1504. Executable code executed by the controller(s)/processor(s) 1504 may use the value 163 to determine a distance of the body (e.g., based on mathematical formula or using a stored table), and control the transmission power of the RF transceivers to reduce or restore transmission power based on the calculated distance, such that power back-off may be continuous as a body 21 approaches the proximity sensor rather than stepped. Such operations may also be performed using the value 163 as received, without converting the value into a distance.

As noted above, the reduction in transmission power may comprise one or more steps of power. The steps maybe a discontinuous discrete step or steps based on one or more threshold distance. Continuous, gradual reductions of transmitter power based on proximity distance may also be used.

The coexistence manager 1282 may exist has a hardware, software, or firmware component. As software or firmware, the coexistence manager may comprise executable code stored in memory 1506 and/or storage 1508 which is executed by the controller/processors 1504.

As discussed in connection with FIGS. 3 and 5, multiple RF feeds in the device 1500 may connect to a single antenna 120. However, the unified proximity detector comprises at least two separate antennae.

The concepts disclosed herein may be applied within a number of different devices and mobile computer systems, including, for example, tablet computers, personal digital assistants (PDAs), laptop/notebook computers, and cellular telephones.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of mobile computing devices, cellular communications, and wireless networks should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

As used in this disclosure, the term "a" or "one" may include one or more items unless specifically stated otherwise. Further, the phrase "based on" is intended to mean "based at least in part on" unless specifically stated otherwise.

What is claimed is:

1. A device, comprising:
a first antenna;
a second antenna, physically separate and electrically insulated from the first antenna;
a first radio frequency (RF) transmitter electrically coupled to the first antenna via a first RF feed and configured to transmit a first RF signal at a first frequency;
a second radio frequency (RF) transmitter electrically coupled to the second antenna via a second RF feed and configured to transmit a second RF signal at a second frequency;
a capacitance sensor configured to determine a capacitance attached to an electrode of the capacitance sensor using a sensing signal output by the capacitance sensor via the electrode, the sensing signal having a lower frequency than the first RF signal and the second RF signal, the capacitance sensor to determine a capacitance value that is proportional to the capacitance;
a first inductor electrically connecting the first antenna to the electrode of the capacitance sensor, the first inductor being configured to (i) pass the sensing signal between the electrode and the first antenna, and (ii) block transmission of the first RF signal from the first antenna into the capacitance sensor;
a second inductor electrically connecting the first antenna to the second antenna, the second inductor being configured to (i) pass the sensing signal between the first antenna and the second antenna, (ii) block transmission of the first RF signal from the first antenna to the second antenna, and (iii) block transmission of the second RF signal from the second antenna to the first antenna;
a first capacitor arranged between the first RF transmitter and the first antenna, the first capacitor to (i) pass the first RF signal from the first RF transmitter to the first antenna, and (ii) block transmission of the sensing signal into the first RF transmitter;
a second capacitor arranged between the second RF transmitter and the second antenna, the second capacitor to (i) pass the second RF signal from the second RF transmitter to the second antenna, and (ii) block transmission of the sensing signal into the first RF transmitter; and
a digital comparator,
wherein:
the digital comparator determines that the capacitance value is greater than a threshold value, and
the first RF transmitter reduces a first transmission power of the first RF signal, and the second RF transmitter to reduce a second transmission power of the second RF signal, in response to the capacitance value being greater than the threshold value, and
wherein the capacitance value increases as a human body approaches either the first or second antennae.

2. The device of claim 1, further comprising:
a metal housing proximate to the first antenna and to the second antenna;
a first electrical insulator arranged between the metal housing and the first antenna; and
a second electrical insulator arranged between the metal housing and the second antenna.

3. The device of claim 1, further comprising:
a first impedance matching circuit arranged between the first RF transmitter and the first capacitor; and
a second impedance matching circuit arranged between the second RF transmitter and the second capacitor.

4. A device comprising:
a capacitance sensor configured to output a sensing signal via an electrode to determine a capacitance, and to output a digital value based on the capacitance;
a first antenna;
a first feed electrically connected to the first antenna, the first feed configured to receive a first signal having a first frequency that is greater than a frequency of the sensing signal, the first antenna to transmit the first signal;
a first capacitor included in the first feed, the first capacitor configured to (i) pass the first signal to first antenna, and (ii) block passage of the sensing signal;
a second antenna;
a second feed electrically connected to the second antenna, the second feed configured to receive a second signal having a second frequency that is greater than the frequency of the sensing signal, the second antenna to transmit the second signal;
a second capacitor included in the second feed, the second capacitor configured to (i) pass the second signal to second antenna, and (ii) block passage of the sensing signal;

a first inductor electrically connecting the electrode of the capacitance sensor to the first antenna, the first inductor configured to (i) pass the sensing signal between the electrode and the first antenna, and (ii) block passage of the first signal; and a second inductor electrically connecting the first antenna to the second antenna, the second inductor configured to (i) pass the sensing signal between the first antenna and the second antenna, and (ii) block passage of the first signal and the second signal.

5. The device of claim 4, further comprising:
a first transmitter connected to the first feed and configured to output the first signal; and
a first digital comparator that compares the digital value based on the capacitance with a first threshold value,
wherein the first transmitter reduces a transmission power of the first signal from a first power level to a second power level in response to the digital value exceeding the first threshold value.

6. The device of claim 5, wherein the first transmitter increases the transmission power from the second power level to the first power level in response to the digital value falling below the first threshold value.

7. The device of claim 5, further comprising:
a second digital comparator that compares the digital value based on the capacitance with a second threshold value, the second threshold value being smaller than the first threshold value,
wherein the first transmitter increases the transmission power from the second power level to the first power level in response to the digital value below the second threshold value.

8. The device of claim 5, wherein a first value of the digital value when the capacitance consists only of an intrinsic capacitance is no more than five hundred times a sum of the first value and the first threshold value, so as to reliably detect a human body at a threshold distance from either of the first or second antennae.

9. The device of claim 4, further comprising:
a first transmitter electrically connected to the first feed and configured to output the first signal; and
a processor communicatively coupled to the first transmitter;
a memory including instruction operable to be executed by the processor to perform a set of actions to configure the processor to:
  receive the digital value from the capacitance sensor;
  instruct the first transmitter to reduce transmission power of the first signal in proportion to an increase in a value of the digital value.

10. The device of claim 4, further comprising:
a third feed electrically connected to the first antenna, the third feed configured to receive a third signal having a frequency that is higher than the frequency of the sensing signal and lower than the first frequency, the first antenna to transmit the third signal;
a third capacitor included in the third feed, the third capacitor configured to (i) pass the third signal to the first antenna and (ii) block passage of the sensing signal; and
a third inductor included in the third feed, the third inductor configured to (i) pass the third signal and (ii) block passage of the first signal.

11. The device of claim 10, wherein the first feed and the third feed electrically connect to the first antenna via a shared conductor.

12. The device of claim 4, further comprising:
a metal housing proximate to the first antenna and to the second antenna;
a first electrical insulator arranged between the metal housing and the first antenna; and
a second electrical insulator arranged between the metal housing and the second antenna.

13. A device comprising:
a first feed port configured to receive a first signal;
a first antenna;
a second feed port configured to receive a second signal;
a second antenna that is physically separate from the first antenna;
a capacitance sensor configured to determine a capacitance coupled to an electrode using a third signal output via the electrode;
first means for blocking passage of the third signal and passing the first signal, the first means arranged between the first feed port and the first antenna;
second means for blocking passage of the third signal and passing the second signal, the second means arranged between the second feed port and the second antenna;
third means for blocking passage of the first signal and passing the third signal, the third means arranged between the electrode of the capacitance sensor and the first antenna;
fourth means for blocking passage of the first signal and passing the third signal, the fourth means arranged between the first antenna to the second antenna; and
fifth means for blocking passage of the second signal and passing the third signal, the fifth means arranged between the first antenna to the second antenna.

14. The device of claim 13, wherein the capacitance sensor further comprises a digital output from which the capacitance sensor outputs a value based on the capacitance coupled to the electrode, the device further comprising:
a first transmitter electrically connected to first feed port, the first transmitter configured to transmit the first signal; and
means for comparing the value from the digital output with a threshold value,
wherein the first transmitter reduces a transmission power of the first signal in response to the value from the digital output exceeding the threshold value.

15. The device of claim 13, wherein at least one of the first means for blocking, the second means for blocking, the third means for blocking, the fourth means for blocking, and the fifth means for blocking comprises a resonant circuit.

16. The device of claim 13, wherein at least one of the first means for blocking, the second means for blocking, the third means, and a combination of the fourth and fifth means for blocking comprises a semiconductor switch.

17. The device of claim 16, further comprising:
a first transceiver configured to communicate at the first frequency, electrically connected to first feed;
a second transceiver configured to communicate at the second frequency, electrically connected to the second feed; and
a switch controller configured to control the semiconductor switch based on whether either of the first transceiver and the second transceiver is scheduled to communicate.

18. The device of claim 13, wherein at least one of the third means for blocking and a combination of the fourth and third fifth for blocking comprises an inductor.

19. The device of claim 13, wherein at least one of the first means for blocking and the second means for blocking comprises a capacitor.

20. The device of claim 13, further comprising:
   a metal housing proximate to the first antenna and to the second antenna;
   a first electrical insulator arranged between the metal housing and the first antenna; and
a second electrical insulator arranged between the metal housing and the second antenna.

* * * * *